United States Patent [19]
Tamagaki

[11] Patent Number: 5,716,148
[45] Date of Patent: Feb. 10, 1998

[54] DATA PRINTING AND OUTPUTTING APPARATUS

[75] Inventor: Akira Tamagaki, Kyoto, Japan

[73] Assignee: Sharp Kabushiki Kaisha, Osaka, Japan

[21] Appl. No.: 581,248

[22] Filed: Dec. 29, 1995

[30] Foreign Application Priority Data

Jan. 31, 1995 [JP] Japan ................... 7-014437

[51] Int. Cl.⁶ .................................................. B41J 29/38
[52] U.S. Cl. ........................... 400/74; 400/54; 395/114
[58] Field of Search ................... 400/54, 74; 395/113, 395/114

[56] References Cited

U.S. PATENT DOCUMENTS

| | | | |
|---|---|---|---|
| 4,557,615 | 12/1985 | Ueno | 395/113 |
| 4,953,103 | 8/1990 | Suzuki | 395/113 |
| 5,113,489 | 5/1992 | Cihiwsky et al. | 395/113 |
| 5,218,353 | 6/1993 | Okumura et al. | 400/74 |
| 5,255,986 | 10/1993 | Koiwai | 400/61 |
| 5,328,278 | 7/1994 | Kokubo | 400/74 |
| 5,488,454 | 1/1996 | Fukada et al. | 395/113 |
| 5,620,264 | 4/1997 | Kagita | 400/703 |

FOREIGN PATENT DOCUMENTS

| | | | |
|---|---|---|---|
| 62-213360 | 9/1987 | Japan | 400/74 |
| 226221 | 10/1987 | Japan | 400/74 |
| 208054 | 8/1989 | Japan | 400/74 |
| 2201630 | 8/1990 | Japan | 400/74 |
| 314361 | 1/1991 | Japan | 400/74 |
| 155974 | 7/1991 | Japan | 400/74 |
| 195359 | 7/1992 | Japan | 400/74 |
| 247980 | 9/1992 | Japan | 400/74 |

*Primary Examiner*—John S. Hilten
*Assistant Examiner*—Steven S. Kelley

[57] ABSTRACT

A data printing and outputting apparatus has a host device, and a digital copying machine connected with the host device through a communication line for printing and outputting data. The control section of the digital copying machine, monitoring the printing operation by the digital copying machine, maintains the communication between the host device and the digital copying machine when the trouble with the digital copying machine is a minor one which does not take time to solve, and stop the communication between the host device and the digital copying machine when the trouble is a major one which takes time to solve. The data printing and outputting apparatus, thus, can increase host device's job efficiency by reducing its workload in the communicating operation between the host device and the digital copying machine.

20 Claims, 21 Drawing Sheets

F I G. 5
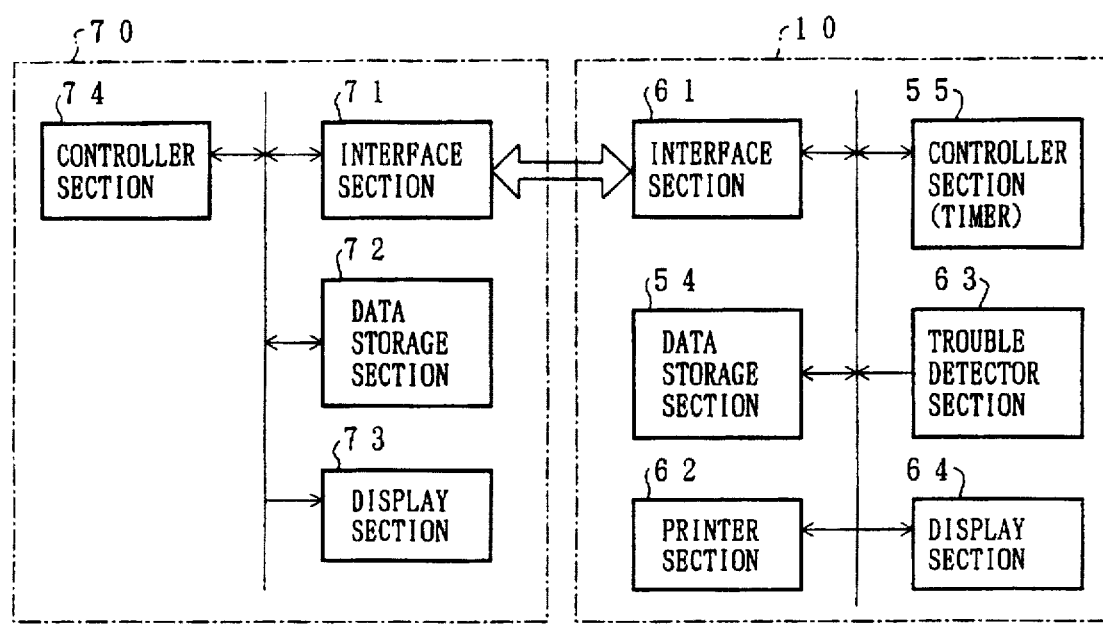

F I G. 6
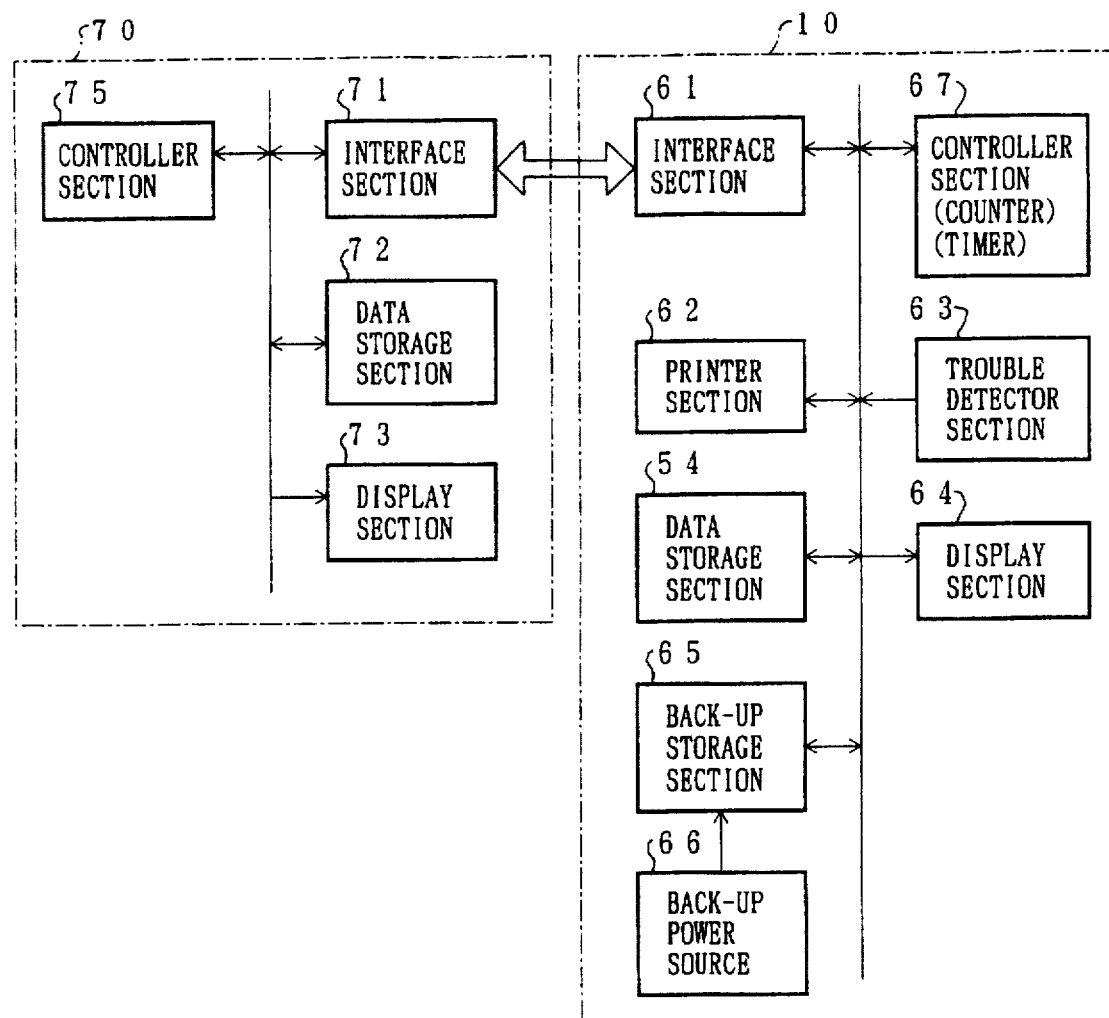

DATA PRINTING AND OUTPUTTING APPARATUS

FIELD OF THE INVENTION

The present invention relates to a data printing and outputting apparatus having a host device for sending image data and a printer for printing and outputting the image data from the host device.

BACKGROUND OF THE INVENTION

A conventional data printing and outputting apparatus is provided with (1) a host device such as a personal computer for sending image data (i.e., print data) and (2) a printer such as a printer or a digital copying machine for printing the print data from the host device. An example of these kinds of apparatuses are disclosed in Japanese Laid-Open Patent Application No. 201630/1990 (Tokukaihei 2-201630). When the conventional printer prints out print data sent from its host device, a signal signifying print ending is sent from the printer to the host device at the end of printing of each line of the print data. In accordance with the signal, the host device monitor the printing operation of the printer until the printing operation is over. In addition, if a trouble arises with the printer in use, the host device assigns the printing task to another printer to continue the printing.

However, the host device must bear a large workload in this conventional arrangement because the host device monitors the printing operation closely until the printing operation of the printer is over. Inevitably, the host device's working capacity for other tasks is greatly reduced. There is another problem with this arrangement because in this arrangement the host device simply changes the printer currently in use with another one when the printer in use has a trouble. Thus, the workload on the host device is likely to grow greater when no alternative printer is connected to the host device. This occurs and even when the trouble with the printer in use is a minor one which could have been solved instantly.

SUMMARY OF THE INVENTION

It is an object of the present invention to provide a data printing and outputting apparatus, having (1) a host device for sending data and (2) a printer connected with the host device through a communication line for printing and outputting the data from the host device, which can reduce the workload on the host device and increase host device's working efficiency when the printer has a trouble.

In order to achieve this object, the data printing and outputting apparatus of the present invention is provided with:

a host device; and a printer, connected with the host device through a communication line, for printing to output data, the printer including a memory for storing data sent from the host device;

a trouble detector for detecting trouble with the printer and for outputting a trouble condition signal indicative of conditions of the detected trouble;

a trouble analyzer for monitoring a printing operation of the printer, and for judging based upon the trouble condition signal if the trouble with the printer is relative minor and does not take much time to solve or relatively major and may take time to solve; and a communication controller for maintaining communication between the host device and the printer when the trouble is judged by the analyzer to be minor based upon the trouble condition signal sent from the detector, and for stopping the communication between the host device and the printer when the trouble is judged to be major.

When there is a major and time-consuming trouble, the above arrangement prevents the host device from maintaining the useless communication with the printer. This can reduce the workload of the host device in the communicating operation with the printer and can increase its job efficiency.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

For a more complete understanding of the nature and advantages of the present invention, reference should be made to the ensuing detailed description taken in conjunction with the accompanying drawings.

BRIEF DESCRIPTION OF THE DRAWINGS

FIG. 5 is a block diagram showing the arrangement of main parts of the digital copying machine and the host device.

FIG. 6 is a block diagram showing the arrangement of main parts of a data printing and outputting apparatus of another embodiment in accordance with the present invention.

DESCRIPTION OF THE EMBODIMENTS

Referring to FIGS. 1 through 5, the following description discusses an embodiment of the present invention.

Figure 2:
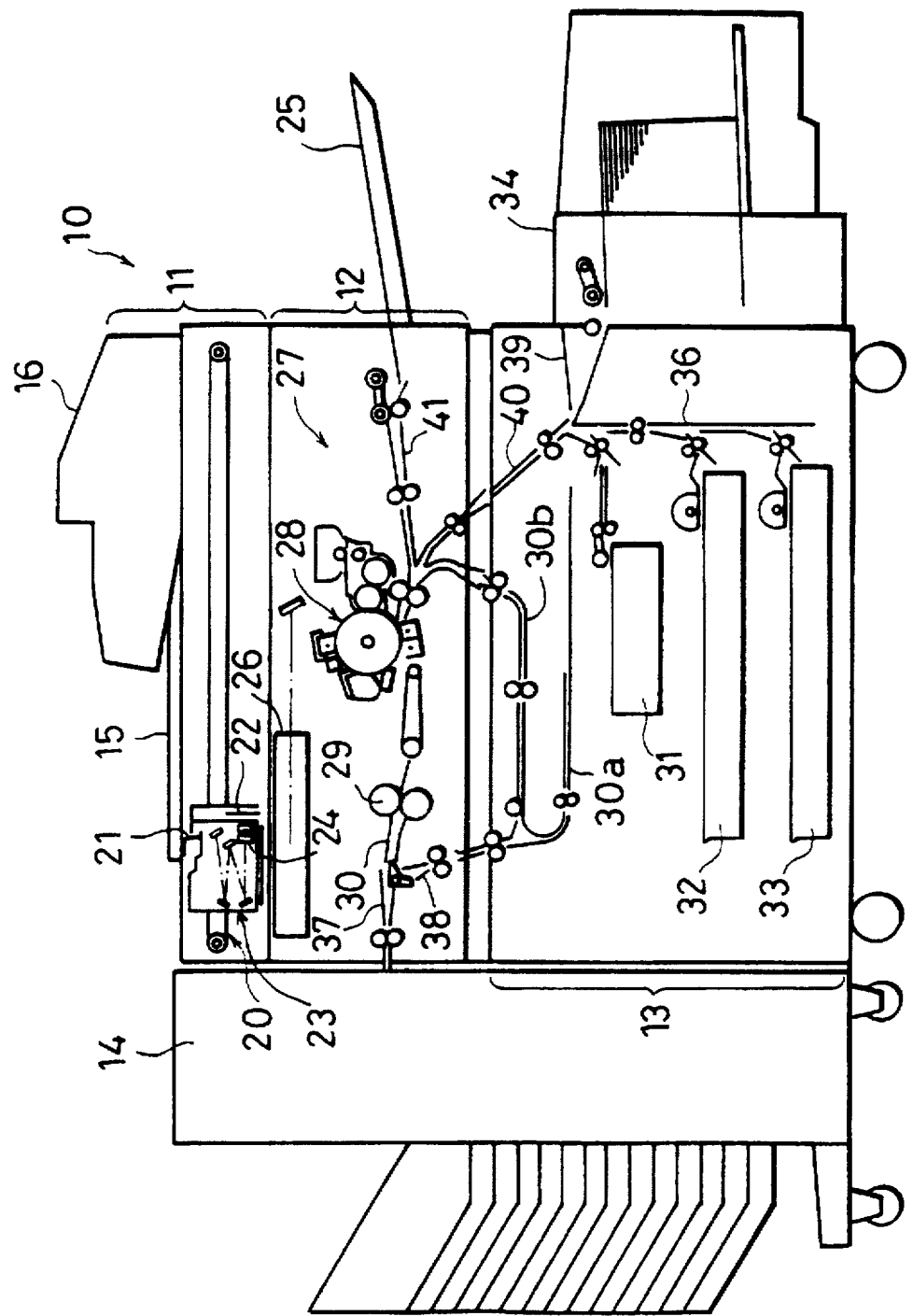
FIG. 2 is a view schematically illustrating an overall structure of the digital copying machine which is part of the above data printing and outputting apparatus.

As shown in FIG. 2, a digital copying machine 10 constituting a printer of the data printing and outputting apparatus of the present embodiment is provided with a scanner section 11, a laser printer section 12, a multistage paper feeder 13, and a sorter 14.

The scanner section 11 is provided with a document platen 15, a recirculating document feeder (RDF) 16 and a scanner unit 20. The multistage paper feeder 13 is provided with first through fourth cassettes 31 through 34. Each paper on top of the cassettes is fed into the laser printer section 12. Documents are placed in the RDF 16. The RDF 16 automatically sends the documents one by one to the scanner unit 20. One side or both sides of each document is (or are) read by the scanner 20 in accordance with the operator's instruction.

The scanner unit 20 is provided with a lamp reflector assembly 21 for exposing the document, reflection mirrors 23 for directing a light image reflected from the document to a charged coupled device (CCD) 22 and lenses 24 for focusing the reflected light image on the CCD 22.

The scanner section 11 is arranged to read the document image in two ways. When the document is placed on the document platen 15, the scanner unit 20 reads the document image while moving along the bottom surface of the document platen 15. When the RDF 16 is used, the scanner unit 20 reads the document image while feeding the document and staying at a predetermined position under the RDF 16.

The document image data obtained through the scanner unit 20 is sent to an image processor section 50 (described later) for various processes and is then stored temporarily in a data storage section 54 of the image processor section 50. The document image data stored in the data storage section 54 is sent to the laser printer section 12 according to output instructions to form its image on the paper.

The laser printer section 12 is provided with a manual document feeding tray 25, a laser writing unit 26, and an electrophotographic processor section 27 for forming an image. The laser writing unit 26 is provided with a semiconductor laser (not shown) which emits a laser beam varying depending on the image data sent from the data storage section 54, a polygonal mirror for deflecting the laser beam at a constant angular velocity, an f-y lens for correcting the laser beam which has been deflected at a constant angular velocity so that it is further deflected at a constant velocity on a photoconductor drum 28 of the electrophotographic processor section 27, and etc. The electrophotographic processor section 27 is provided with, in accordance with a conventional system, an electrostatic charger, a developer, an electrostatic remover, a fuser 29, and etc., all of which are placed around the photoconductor drum 28.

Passages 30 and 37, the sorter 14, a passage 38 and a multistage paper feeder 13 are on the downstream of the fuser 29 in the paper feeding direction. The passage 38, in the multistage paper feeder 13, forks out to form 2 passages: a reverse passage 30a for double side copying, and a double side/composite passage 30b for double side copying and composite copying. The multistage paper feeder 13 has a common passage 36 which is merged by a passage 39 and leads to a passage 40. The passage 40 merges with the double side/composite passage 30b and a passage 41 so as to lead to the image formation place between the photoconductor drum 28 and the imprinter.

Hence, image data read from a data storage section 54 is converted into a laser beam by the laser writing unit 26, the laser beam being converged onto the surface of the photoconductor drum 28 to form an electrostatic latent image thereon. The toner in the developer changes the electrostatic latent image into a visible toner image. The toner image is transformed onto the paper fed by the multistage paper feeder 13, and is then fused on the paper by the fuser 29. The fused paper is then sent from the fuser 29 either through the passages 30 and 37 to the sorter 14, or through the passages 30 and 38 to the passages 30a and 30b for double side copying or composite copying.

Figure 3:
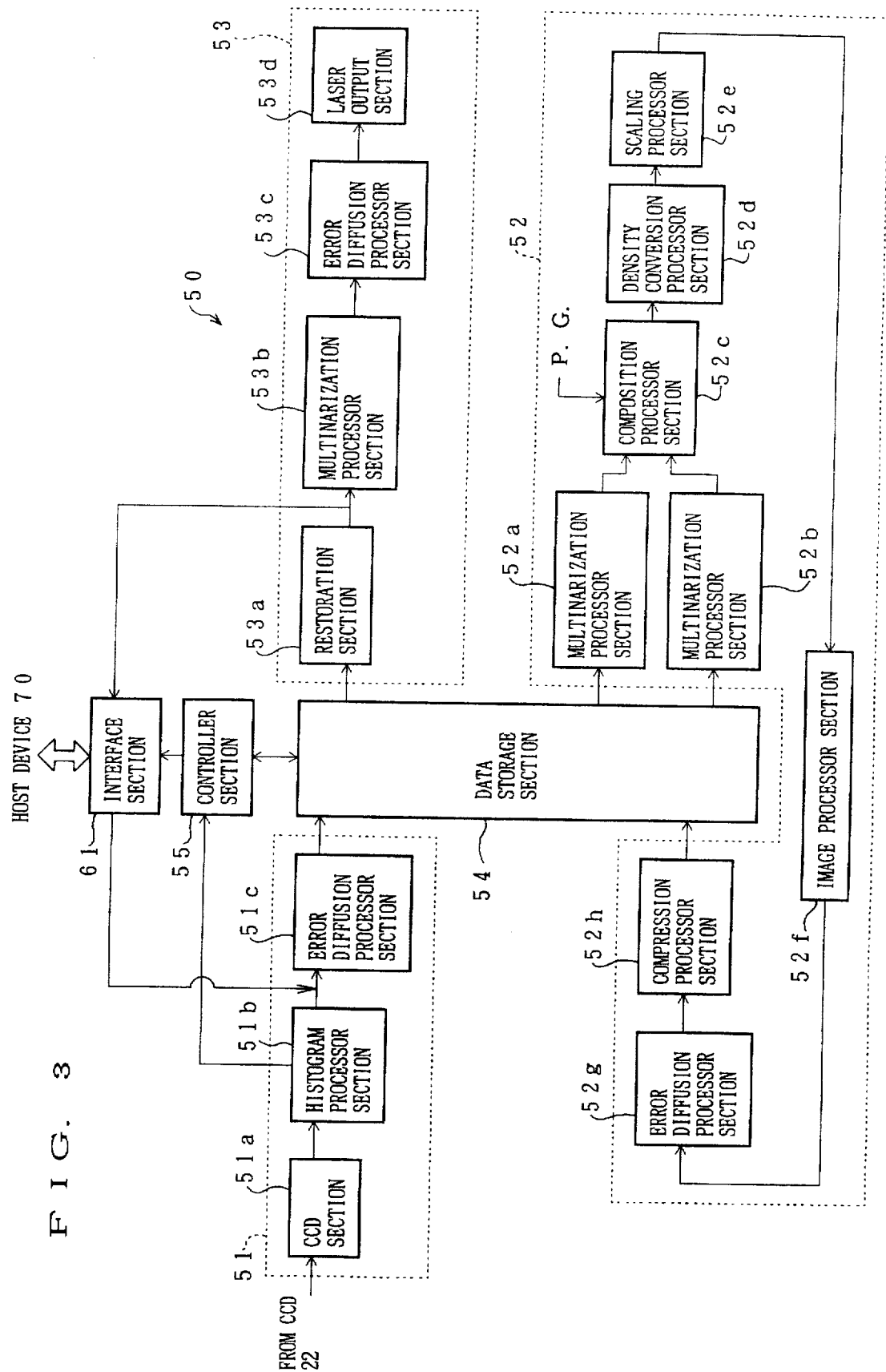
FIG. 3 is a block diagram showing the arrangement of the image processor section which is part of the above digital copying machine.

Moreover, the present digital copying machine is provided with an image processor section 50 shown in FIG. 3 which has an image data input section 51, an image data processor section 52, an image data output section 53, a data storage section 54 and a controller section 55 composed of a microcomputer.

The image data input section 51 is provided with a CCD section 51a, a histogram processor section 51b and an error diffusion processor section 51c. The image data input section 51 is arranged to convert into binary data the image data of the document read by the CCD 22, to process the image data by the error diffusion method while drawing a histogram in the form of the binary digital amount at the same time, and to temporarily store the processed image data in the data storage section 54.

In other words, in the CCD section 51a, an analog electric signal which varies depending on each pixel density of the image data is converted into a digital signal. Then, one of the three corrections, namely MTF correction, Black & White correction and Gamma correction, is carried out to the digital signal so that a digital signal of 256 tones (8 bits) is outputted to the histogram processor section 51b.

In the histogram processor section 51b, an adding operation is carried out for each pixel density of 256 tones in accordance with the digital signal sent from the CCD section 51a so as to obtain density information (histogram data). The histogram data, obtained in accordance with the need, is sent to the controller section 55 or to the error diffusion processor section 51c as pixel data.

In the error diffusion processor section 51c, the digital signal of 8 bit pixel sent from the CCD Part 51a is converted into a signal of 1 bit (binary) by the error diffusion method, a kind of quasi-halftone processing or, i.e., a method to reflect the error due to the binary conversion in judging whether neighboring pixels are "0" or "1". A relocating operation is then performed to faithfully reproduce a local area density of the original document.

The image data processor section 52 is provided with multinarization processor sections 52a and 52b, a composite processor section 52c, a density conversion processor section 52d, a scaling processor section 52e, an image processor section 52f, an error diffusion processor section 52g, and a compression processor section 52h.

The image data processor section 52 finally converts the input image data into the image data as needed by the operator, and maintains such a conversion until the data storage section 54 stores the finally converted output image data. Note that each of the processor sections in the image data processor section 52 functions only when necessary.

More specifically, in the multinarization processor sections 52a and 52b, the data which has been converted into a binary signal by the error diffusion processor section 51c is converted again into 256 tones. In the composite processor section 52c, a logical operation, either a logical OR, a logical product (AND) or an exclusive-OR, is selectively conducted for each pixel, and applied to (1) the pixel data stored in the data storage section 54 and (2) bit data sent from a pulse generator (PG). In the density conversion processor section 52d, the relationships between the output density and the input density of the 256 tone digital signals is determined in accordance with a predetermined tone conversion table.

In the scaling processor section 52e, the interpolation is carried out with respect to the inputted already-known data according to the scale (the enlargement or reduction) as instructed, thereby obtaining pixel data (density value) of the scaled target pixel. The scaling process is carried out in the auxiliary scanning direction first, and then in the main scanning direction. In the image processor section 52f, various image processings are carried out with the inputted pixel data, and information about the data sequence such as feature extraction is also collected. In the error diffusion processor section 52g, the same processings as in the error diffusion processor section 51c of the image data input section 51 are carried out. In the compression processor section 52h, the binary data is compressed by the encoding called Run Length. In addition, the compression processing of image data is carried out in the last processing loop after the final output image data is completed.

The image data output section 53 is provided with a restoration section 53a, a multinarization processor section 53b, an error diffusion section 53c and a laser output section 53d. The image data output section 53 is arranged to restore the compressed image data stored in the data storage section 54, to convert the restored image data back into the original 256 tones, to carry out its error diffusion method into quarternary data which expresses a halftone more smoothly than the binary data, and to transfer the data to the laser output section 53d.

In other words, in the restoration section 53a, a restoration processing is carried out with respect to the image data compressed in the compression processor section 52h. In the multinarization processor section 53b, the same processings as in the multinarization processor sections 52a and 52b of the image data processor section 52 are carried out. In the error diffusion processor section 53c, the same processings as in the the error diffusion processor section 51c of the image data input section 51 are carried out. In the laser output section 53d, digital image data is converted based on control signals sent from the sequence controller (not shown) into laser's on/off signals which turn on/off the laser.

It should be noted that the data processed in the image data input section 51 and image data output section 53 is basically stored in the storage data section 54 in the form of binary data to save its capacity, but taking deterioration of the image data into consideration, it is also possible to store it in the form of quarternary data.

The image processor section 50 is connected with an interface section 61 which is further connected with a host device 70 by a communication line. For example, in a case where a personal computer is used as a host device 70, the digital copying machine will serve as its printer. The image data sent from the host device 70 can be received through the interface section 61 and supplied to the error diffusion processor section 51c of the image data input section 51. This image data, just like the image data from the CCD 22, can be outputted in the form of an image through the image data output 53. Meanwhile, the image data which was read out from the data storage 54 and processed by the restoration section 53a of the image data output section 53 can be sent from the interface section 61 to the host device 70 through the communication line.

Figure 4:
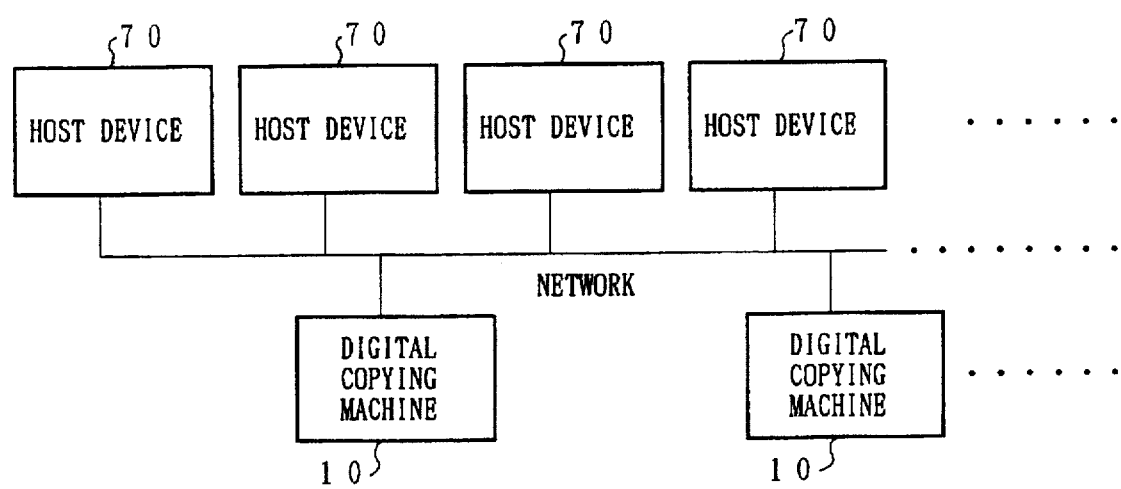
FIG. 4 is an explanatory view showing a network composed of digital copying machines and host devices which are provided in the above data printing and outputting apparatus.

The digital copying machines 10 and the host devices 70 in above arrangement are connected by the communication line as shown in FIG. 4 to form a network of digital copying machines 10 and host devices 70.

FIG. 5 shows the arrangement of a digital copying machine 10 for receiving image data from a host device 70 and for printing and outputting the image data. A digital copying machine 10 is provided with, as in FIG. 5, the interface section 61, the data storage section 54 as inputted data storing means, a printer section 62, the controller section 55 as communication control means and trouble analyzing means, a trouble detector section 63 as trouble detecting means, and a display section 64.

The printer section 62, corresponding to the whole machine shown in FIG. 2 except the scanner section 11, outputs image data by printing it on paper. The trouble detector section 63 detects such abnormalities of the digital copying machine 10 that the printing operation of image data must be stopped.

The controller section 55 judges, based on trouble detecting signals sent from the trouble detector section 63, whether the troubles are minor ones which can be solved by the user himself, or major ones which need to be taken care of by a customer engineer.

Minor troubles includes, for example: (1) Paper jam occurs in a passage of the digital copying machine 10. (2) Paper has run out in a paper cassette. (3) The front door of the digital copying machine 10 is left open. (4) The toner in the developer has run out, and etc. The trouble detector section 63 corresponds to sticking paper sensors provided in the passages of the digital copying machine 10 for the case (1), paper sensors provided in the first through fourth cassettes 31 through 34 for the case (2), a door switch to detect the opening/closing of digital copying machine's front door for the case (3), and a toner sensor provided in the developer for the case (4).

Major troubles include, for example: (a) a locked motor, (b) a scanner trouble, (c) a fuser trouble, (d) a copy-lamp trouble, (e) a communication trouble, (f) a laser trouble, and etc. The detector for each of these troubles and/or the circumstances under which it is detected are: (a) an encoder provided in the motor for detecting a rotation speed, when it slows down, (b) a sensor provided in scanner unit 20's original position, when the scanner unit fails to return to its original position and to turn on the sensor within the predetermined time, (c) a thermistor provided in the roller of the fuser 29, when the roller's temperature goes out of a predetermined range, (d) a charged coupled device (CCD), when its level is below a predetermined value on adjusting the white level against the standard white board with the copy-lamp turned on, (e) when no answer to an outbound command/data in the communication between each board is sent back, (f) an original position detector provided in the scanning direction in the laser input unit 26, when the laser signal does not return to its original position within a predetermined time.

The controller section 55 controls the interface section 61 based on the judgement whether the trouble is a minor one or a major one so as to turn on/off the communication between the interface section and the host device 70. The controller section 55 also watches the conditions of the digital copying machines 10 (e.g. if the above troubles are already solved). The controller section 55 is provided with a timer as means to measure the predetermined time.

The display section 64 is, for example, provided at a control panel (not shown) of the digital copying machines 10.

Meanwhile, the host device 70 is provided with, an interface section 71 to send/receive image data to/from the digital copying machine 10, a data storage section 72 to store image data which is to be printed out by a digital copying machine 10, that is, print data, a display section 73, and a controller section 74 to control these sections.

In the arrangement, the following description will discuss operations of the present data printing and outputting apparatus.

The image data (i.e., print data) stored in the data storage section 72 of the host device 70 is sent from the interface section 71 to the digital copying machine 10 through the communication line. This print data received by the interface section 61 of the digital copying machine 10 is stored in the data storage section 54. The print data stored in the data storage section 54 is printed in the paper by the printer section 62 which is controlled by the controller section 55.

Figure 1:
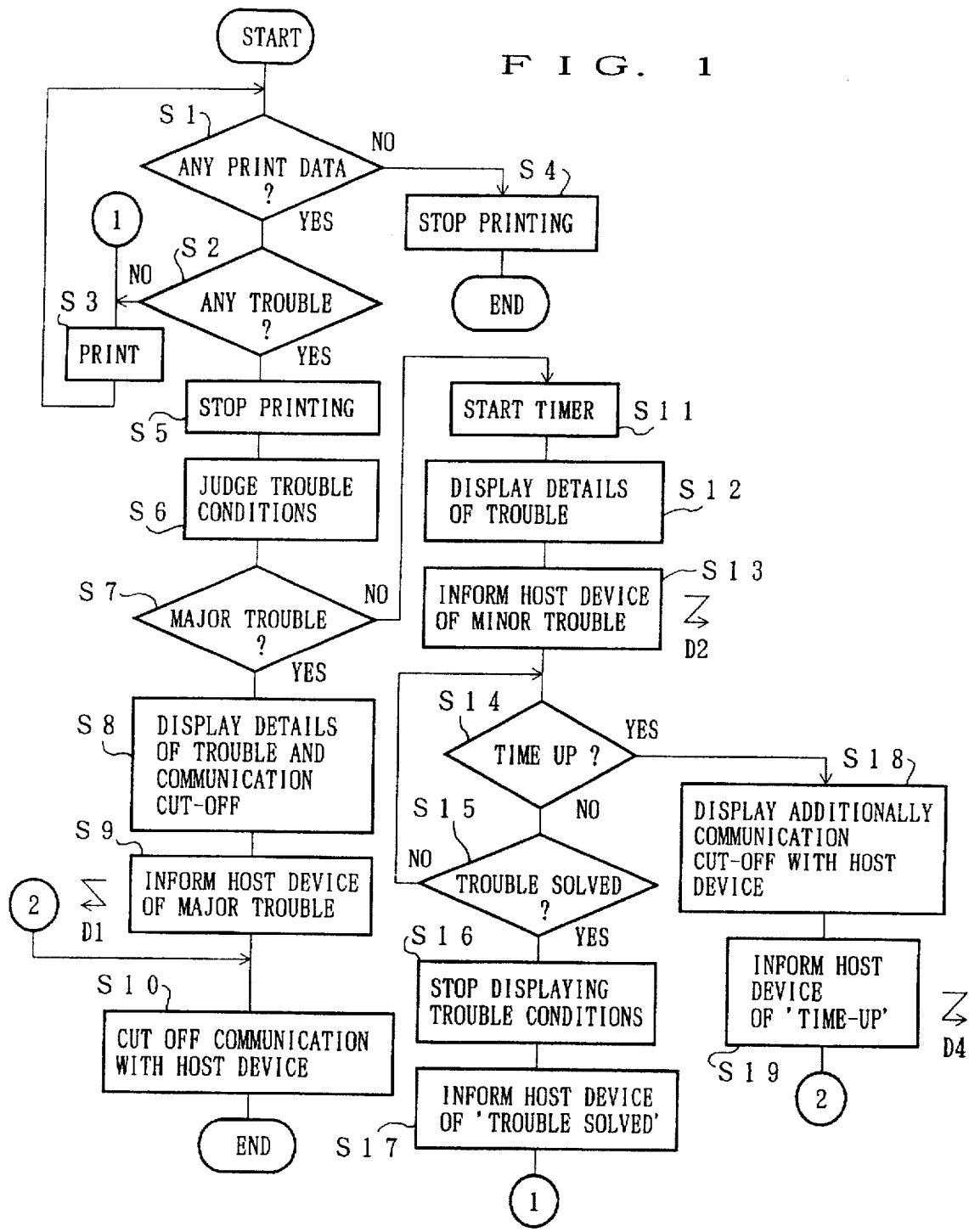
FIG. 1 is a flowchart showing operations of a data printing and outputting apparatus of an embodiment in accordance with the present invention.

In this operation, as shown in FIG. 1, when there is print data in the data storage section 54 (S1) and when no trouble of the digital copying machine 10 is detected by the the trouble detector section 63 (S2), the printer section 62 controlled by the controller section 55 prints the data (S3). When the printer section runs out print data (S1), it stops printing (S4) and finishes the operation.

If a trouble is detected in S2, the controller section 55 stops the printing of the printer section 62 (S5), and judges the conditions of the trouble based on the trouble detecting signals sent from the trouble detector section 63 (S6). In short, the controller section 55 judges if the trouble is a minor one or a major one.

If the trouble is judged to be a major one (S7), the controller section 55 controls the display section 64 display details of the trouble (S8), and the interface section 61 sends to the host device 70 a signal informing that it is a major trouble (S9, D1). In this way, in the host device 70, the display section 73 is controlled by the controller section 74 so as to display a message of the trouble occurring with the digital copying machine 10, and a message of the communication cut-off with the digital copying machine 10. Thereafter, the controller section 55 controls the interface section 61 of the digital copying machine 10 to cut off the communication with the interface section 71 of the host device 70 (S10).

This communication cut-off may be done either by the interface section 71 of the host device 70 which has received information on a major trouble, or by both the interface sections 61 and 71.

On the other hand, if the trouble is judged to be minor in S7, the controller section 55 controls the timer to start (S11) and the display section 64 to display details of the trouble (S12). The controller section 55 then controls the interface section 61 to send to the host device 70 a signal informing that it is a minor trouble (S13, D2). In the host device 70, a message of the trouble occurring with the digital copying machine 10 is displayed by the display section 73.

Next, if the trouble is solved (S15) before the predetermined time is measured by the timer (S14) and the printing operation can be continued, the controller section 55 controls the display section 64 so as to stop the display of the trouble (S16), and controls the interface section 61 so as to send the host device 70 a signal informing that the trouble is solved (S17, D3). Thus, in the host device 70, the display in the display section 73 is changed to the display of a message showing the printing is continued at the digital copying machine 10. Then, S3 is proceeded, and the controller section 55 controls the printer section 62 to restart the printing.

Meanwhile, if the predetermined time is up before the trouble is solved in S14, the controller section 55 controls the display section 64 to display an additional message showing that the communication with the host device 70 has been cut off (S18). Moreover, the controller part 55 controls the interface section 61 so that a signal informing that the time is up (S19, D4) is sent from the interface section 61 to the host device 70. The display section 73 of the host device 70, thus, displays an additional message showing that the communication with the digital copying machine 10 has been cut off. Then, the operation goes on to S10, and the controller section 55 controls the interface section 61 to cut off the communication with the host device 70.

Messages at the host device 70 in accordance with the operations of S9 and S13 may be a kind which can distinguish between a minor trouble and a major trouble.

Furthermore, a trouble causing to turn off the power source can be solved by a conventional arrangement: At least the controller section 55, the interface section 61, and the display section 64 of the digital copying machine 10 in FIG. 5 are connected with a back-up power source, and the data storage section 54 of the digital copying machine 10 in FIG. 5 is backed-up.

As explained above, according to the present data printing and outputting apparatus, if the trouble, which has occurred with the digital copying machine 10 during communication between the digital copying machine 10 and the host device 70 which transmits print data to the digital copying machine, is a minor one which does not take time to solve, the communication between the digital copying machine 10 and the host device 70 is maintained. But if such a trouble is a major one which takes time to solve, the communication between them is cut off. Hence, the present data printing and outputting apparatus can prevent decline in its job efficiency caused by meaninglessly maintaining the communication between the digital copying machine 10 and the host device 70, thereby increasing its job efficiency.

Moreover, even if digital copying machine 10's trouble is minor, the present data printing and outputting apparatus cuts off the communication between the digital copying machine 10 and the host device 70 after the predetermined time is elapsed with the trouble not yet solved. Thus, a minor trouble which is left unattended or takes time to solve does not cause decline in job efficiency of the host device 70, which is another way to increase its job efficiency.

Furthermore, digital copying machine 10's trouble conditions are displayed in the display section 64 of the digital copying machine 10 and/or the display section 73 of the host device 70. Hence, the trouble can be solved quickly to increase job efficiency of both the host device 70 and the digital copying machine 10.

Referring to FIG. 6 through FIG. 14, the following description discusses another embodiment of the present invention. Here, for convenience, those means of the following embodiment that have the same functions, and that are mentioned in the above embodiment are indicated by the same reference numerals and description thereof is omitted.

The data printing and outputting apparatus of the present embodiment, as shown in FIG. 6, is provided with a digital copying machine 10 and a host device 70: The digital copying machine 10 is provided with a back-up storage section 65, a back-up power source 66 for the back-up storage section 65, and a controller section 67 which substitutes for the above controller section 55 and works as communication controlling means on the printer side, trouble condition analyzing means, and unoutputted data detecting means; The host device 70 is provided with a controller section 75 which substitutes for the controller section 74 and works as communication controlling means on the host device side and data-identifying-information setting means. Here, both the data storage section 54 and the back-up storage section 65 are volatile storage sections. It is possible to use a back-up storage section 65 of a smaller capacity than that of the data storage section 54. Only the host identification code and the data identification code are designed to be picked up from the codes shown in FIG. 7 and stored in the back-up storage section 65 by the controller section 67.

Figure 7:
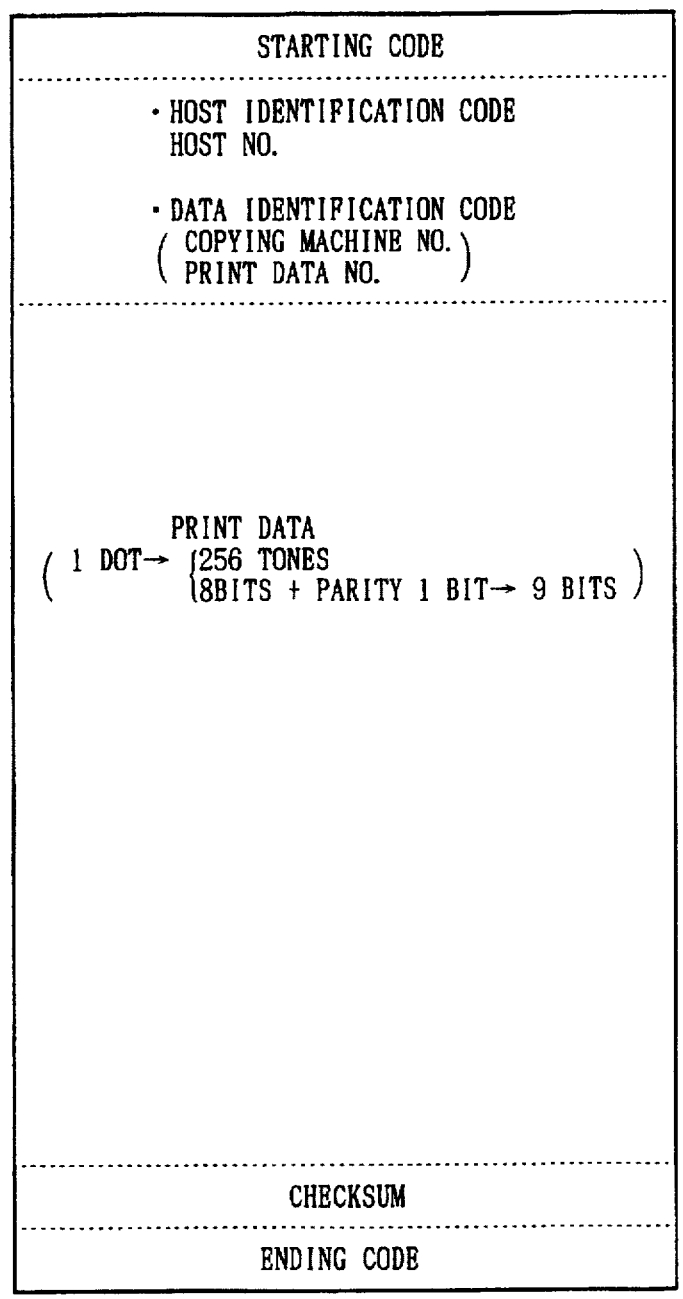
FIG. 7 is an explanatory view showing the structure of data sent from a host device to a digital copying machine which are arranged as in FIG. 6.

The data to be read out from the data storage 72 which is transmitting data store means of the host device 70, and then to be sent from the interface section 71 to the digital copying machine 10 has the structure composed of, as shown in FIG. 7, a starting code, a host identification code, a data identification code, a print data, a checksum, and an ending code. A set of codes with this structure is a file of data which, for example, has a volume equivalent to 3 pages in A4-sized paper or 1 page in A3-sized paper.

The host identification code, being the host number assigned to an individual host device 70, means the code to identify a designated host device 70 among those shown in FIG. 4. The data identification code means (1) the number assigned to an individual digital copying machine 10 in FIG. 4 and (2) the print data number assigned to print data in a block between the starting code and the ending code which are included in the data structure shown in FIG. 7.

The controller section 67 manages operations of the printer section 62. In other words, the controller section 67 watches if the printer section 62 is printing out its data, and at the same time has the function of a counter as unoutputted data detecting means. The unoutputted data detecting means is composed of the combination of the controller section 67 with a paper sensor (not shown) in order to count the printed pages. The paper sensor detects paper which is already printed and discharged from the digital copying machine 10. Moreover, the controller section 67 controls operations shown in FIGS. 10 through 12. The controller section 75 controls operations shown in FIGS. 8, 9, and 13.

The following description will discuss operations of the present data printing and outputting apparatus having the foregoing arrangement.

When the host device 70 receives a command, e.g. through a keyboard, to print the image data stored in the data storage 72, the host device shifts from its current job to this new job. In this case, one of the digital copying machines 10 shown in FIG. 4 is selected for use in printing as in FIG. 8 (S31): the controller section 75 checks the digital copying machines 10 one by one and finds one which is not in use (S32) and has no trouble (S33). Image data to be printed is then sent to this selected one (S34).

Figure 9:
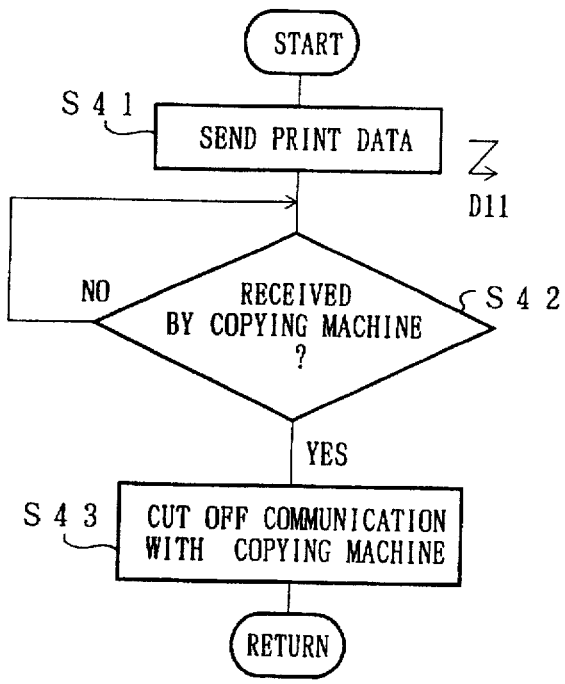
FIG. 9 is a flow chart showing a data sending operation of the host device arranged as in FIG. 6.

The data sending operation in S34 is composed of operations shown in FIG. 9: the controller section 75 controls the data storage section 72 to send its print data from the interface section 71 to the above selected digital copying machine 10 (S41). This print data has the structure shown in FIG. 7. The copying machine number in the data identification code may be assigned when the print data is sent. The controller section 75 then controls the interface section 71 to cut off its communication with the digital copying machine 10 (S43) after the digital copying machine 10 completes reception of the print data (S42).

Figure 10:
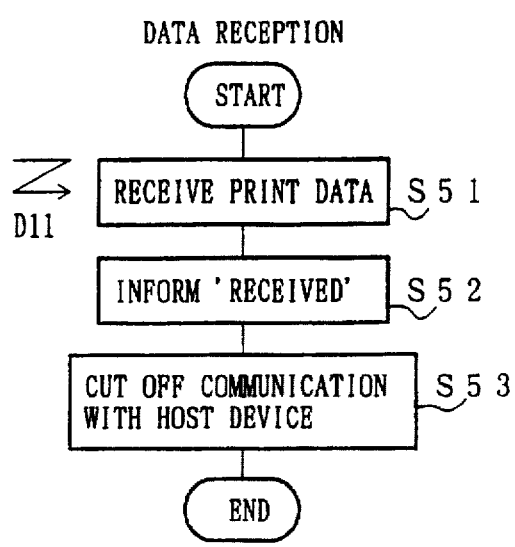
FIG. 10 is a flow chart showing a data receiving operation of the digital copying machine arranged as in FIG. 6.

Responding to host device 70's data sending operation as described above, the digital copying machine 10 receives data as shown in FIG. 10: the digital copying machine 10 selected by the host device 70 receives print data sent from the host device 70 through the interface section 61 (S51, D11), and the print data is stored in the data storage section 54. The host identification code and the data identification code in such print data are extracted and stored in the code storage section 65 by the controller section 67. When the print data reception is completed, the controller section 67 controls the interface section 61 to inform the host device 70 of the completion (S52), and then cut off the communication with the host device 70 (S53).

Figure 11:
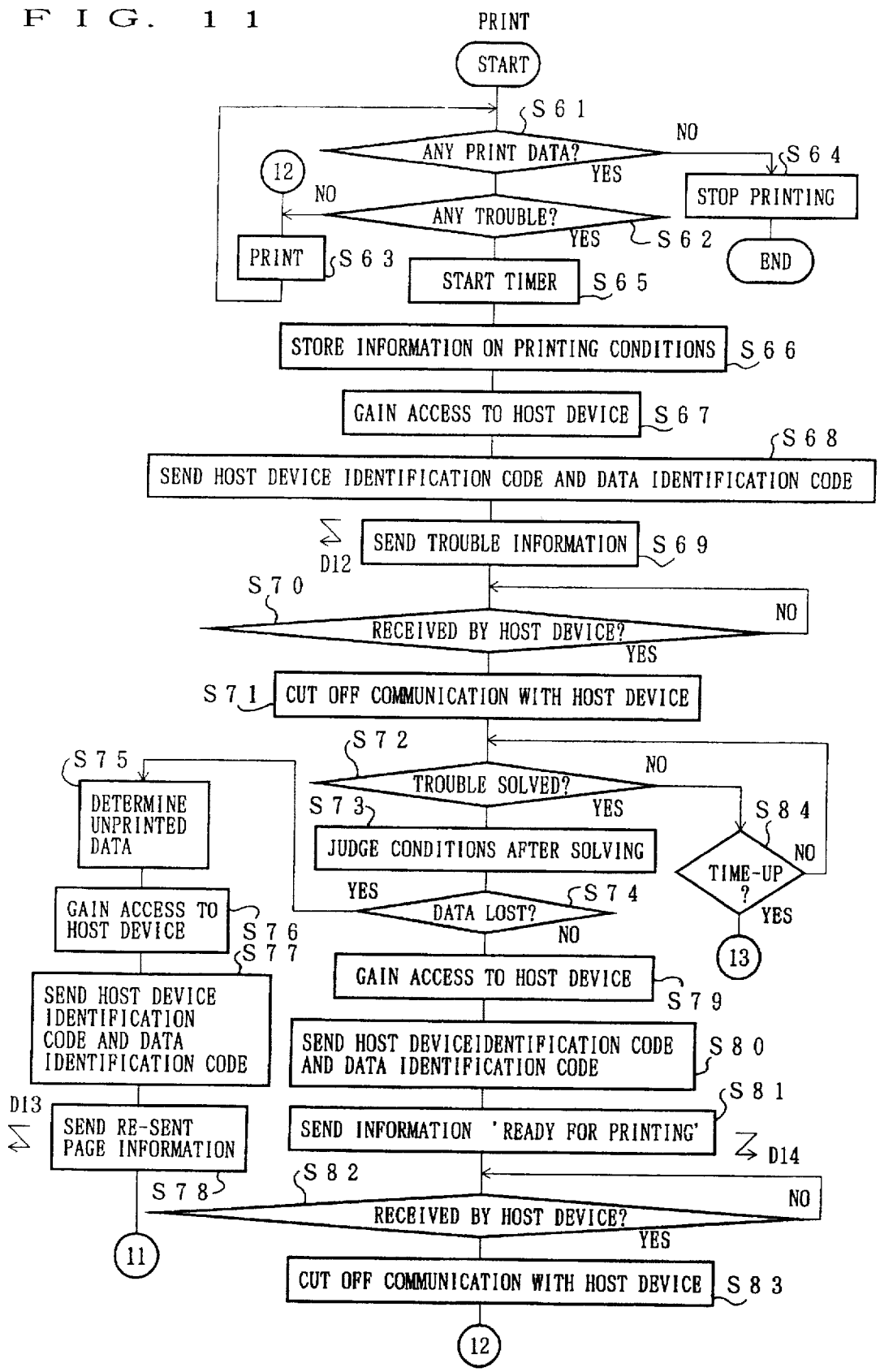
FIG. 11 is a flow chart showing a printing operation of the digital copying machine arranged as in FIG. 6.
Figure 12:
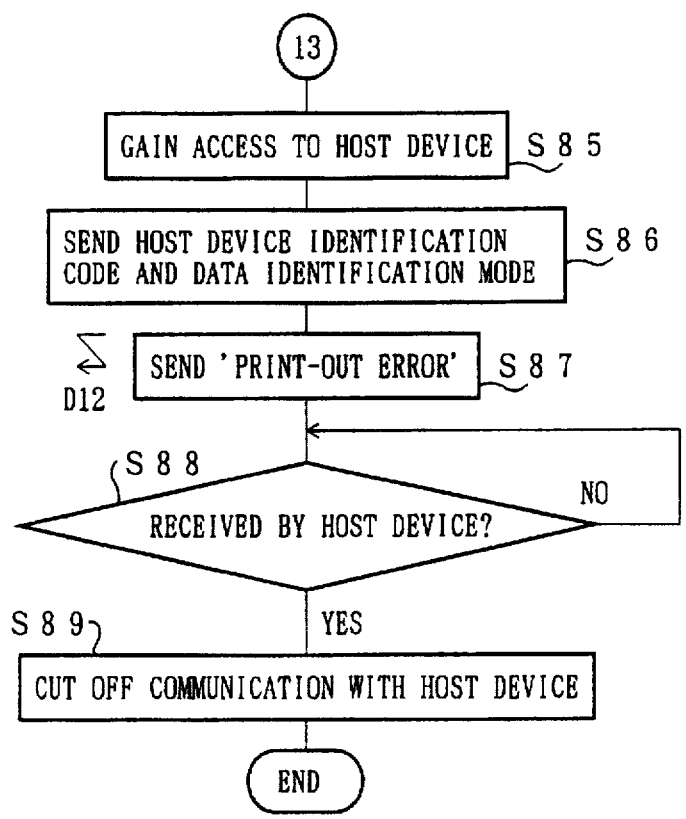
FIG. 12 is a flow chart showing a printing operation of the digital copying machine which follows the operation shown in FIG. 11.

The print data stored in the data storage 54 goes through operations shown in FIGS. 11 and 12 to be printed in paper: if there is print data in the data storage 54 (S61) and if no trouble is detected with the digital copying machine 10 by the trouble detector section 63 (S62), the controller section 67 controls the printer section 62 to print out the print data (S63). When there is no more print data (S61), the controller section 67 stops printing (S64) and finishes the operation.

On the other hand, if a trouble is detected in S62, the controller section 67 starts a timer (S65) and controls the back-up storage section 65 to store information on the printing conditions, printed pages and etc (S66). Next, the digital copying machine 10 gains access to the host device 70 (S67) to inform it of the host identification code and the data identification code (S68), and sends a signal to inform that the printing is stopped because of a trouble (S69, D12). Next, when the controller section 67 is informed by the host device 70 that the host device 70 has completed the data reception (S70), the controller section 67 controls the interface section 61 to cut off its communication with the host device 70 (S71).

Next, when the trouble solving process is completed (S72), the controller section 67 checks the after-trouble conditions (S73). If any loss is found in the print data in the data storage section 54 (S74), the controller section 67 determines unprinted data based on the information in the back-up storage section 65 on the last page already printed before the trouble (S75). Then, the digital copying machine 10 gains access to the host device 70 (S76), so as to send the host identification code and the data identification code (S77), and information on pages to be sent again, that is, the above unprinted data (S78, D13). Next, the digital copying machine 10, in response to the request for resending data from the host device 70, carries out the receiving operation as shown in FIG. 10 and prints the print data by operations shown in FIG. 11.

However, if no loss is found in S74, the digital copying machine 10 gains access to the host device 70 (S79) so as to (1) send the host identification code and the data identification code (S80), and (2) send information that the printer is ready for printing (S81, D14). Then, upon receiving a response from the host device 70 that the reception is completed (S82), the controller section 67 controls the interface section 61 to cut off the communication with the host device 70 (S83). Next, S63 is proceeded to and the digital copying machine 10 restarts printing.

If the predetermined time measured by the timer of the controller section 67 is up before the trouble is solved (S84), the digital copying machine 10 gains access to the host device 70 (S85) so as to send print-error trouble information (S87, D12) and send the host identification code and the data identification code (S86) as shown in FIG. 12. Then, upon receiving a response from the host device 70 that the reception is completed (S88), the controller section 67 controls the interface section 61 to cut off its communication with the host device 70 (S89).

Figure 13:
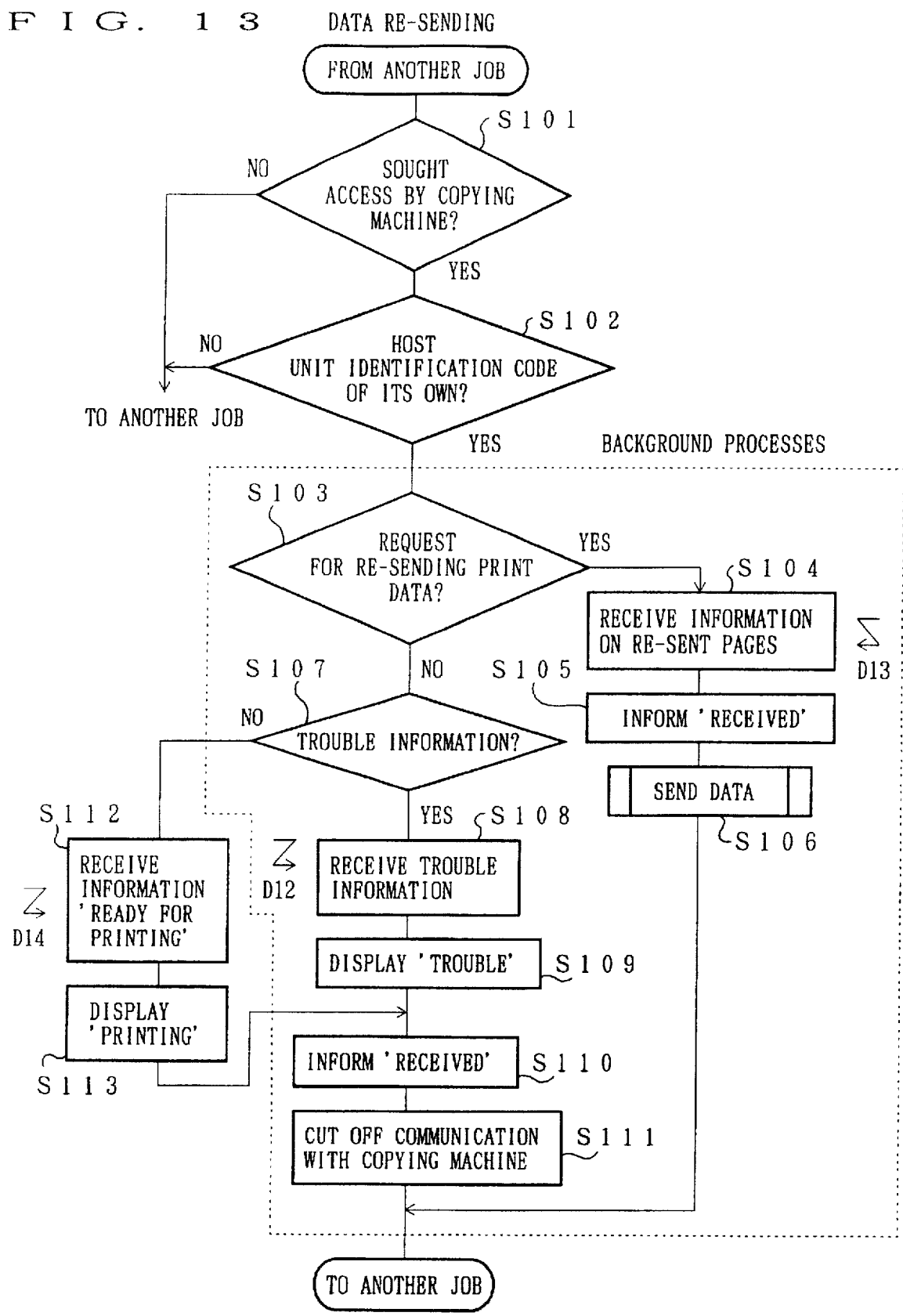
FIG. 13 is a flow chart showing a data resending operation of the host device arranged as in FIG. 6.

The host device 70, in response to the above operations of the digital copying machine 10, carries out the operation in FIG. 13. In this case, if access is sought from the digital copying machine 10 (S101), the host device 70, shifting from its current job, judges if the host identification code sent from the digital copying machine 10 is its own code (S102). If the host device 70 receives its own host identification code and a request for resending the print data (S103), the host device 70 receives the information on pages to be resent from the digital copying machine 10 (S104, D13).

Then, the host device 70 informs the digital copying machine 10 that the reception is completed (S105), and sends data as shown in the FIG. 9 (S106).

Meanwhile, if the signal from the digital copying machine 10 in S103 is not a request for resending the print data, the host device 70 judges if the signal is trouble information (S107). If so, the signal is received (S108, D12) and displayed in the display section 73 to show the trouble with the digital copying machine 10 (S109). Then, the host device 70 informs the digital copying machine 10 that the reception is completed (S110) and cuts off its communication with the digital copying machine 10 (S111).

However, if the signal in S107 is not trouble information, which means that the signal bears information that the digital copying machine 10 is ready for printing (S12, D14), the signal is received and displayed in the display section 73 to show that the digital copying machine 10 is printing data (S113). Then, the host device 70 shifts to S110 and carries out following operations. The operations enclosed in the dashed line in FIG. 13 show digital copying machine 10's background processings.

The host device 70 in S109 displays the printing suspension caused either by digital copying machine 10's trouble whose information is received in S108 by the host device 70 through digital copying machine 10's operation S69, or by digital copying machine 10's print-out error whose information is received in S108 by the host device 70 through digital copying machine 10's operation S87. This display enables the host device 70 to transfer the data printing task to another digital copying machine 10 to continue printing. This transfer, carried out by the copying machine-selecting operation shown in FIG. 8, prevents the host device 70 from maintaining communication with the digital copying machine 10 meaninglessly, and increases its job efficiency. Moreover, this makes quick printing possible when the user is in a hurry.

Figure 8:
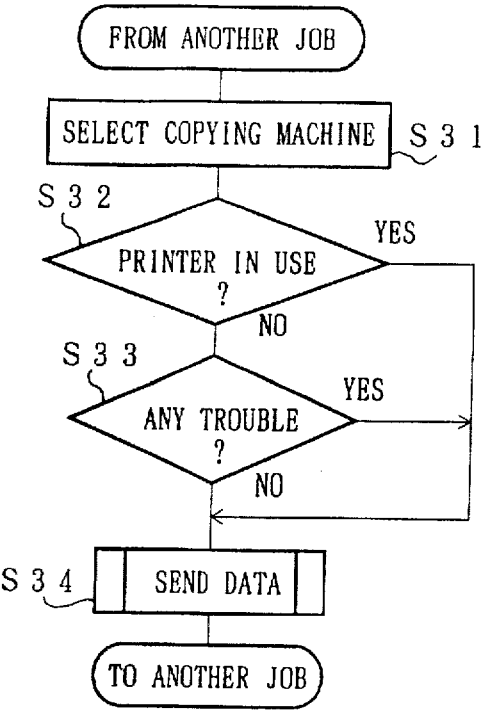
FIG. 8 is a flow chart showing a selecting operation of the digital copying machine by the host device which are arranged as in FIG. 6.

In addition, the present data printing and outputting apparatus may be arranged so that the host device 70 shifts to the copying machine-selecting operation shown in FIG. 8 automatically and instantly when the host device 70 receives trouble information such as the above print-out error.

Furthermore, the data printing and outputting apparatus of the present embodiment is arranged as above to cut off the communication between the host device 70 and the digital copying machine 10 after both the sending and the reception of print data and other information between the host device 70 and digital copying machine 10 are completed. It is also arranged so that in case where there is loss in digital copying machine 10's print data because of a trouble of the digital copying machine 10, print data is resent from the host device 70 to the digital copying machine 10 according to a request made by the digital copying machine 10. This arrangement can reduce host device 70's workload by cutting down the communication time between the host device 70 and the digital copying machine 10, thereby further increasing the job efficiency of the digital copying machine 10.

Data resent from the host device 70 to the digital copying machine 10 is limited only to unprinted data lost in a trouble, which cuts down the time needed in resending print data, thereby increasing the job efficiency of the host device 70 still further.

In addition, since only the host identification code and the data identification code, instead of the whole data stored in the data storage section 54, are backed-up, a small memory can perform the duty as the back-up storage section 65.

Another trouble of lost print data of the digital copying machine 10, besides the foregoing troubles, is loss of memory managing information in the controller section 67 when a non-volatile memory, for example a disk memory, is used for the data storage section 54. But, such a trouble can also be solved by the arrangement of the present embodiment in which the back-up storage section 65 backs-up the memory managing information.

The present embodiment does not deal with a trouble which causes turning off of the power source and assumes that print data is lost due to some error, for example, while data is being sent. Under this assumption, a conventional error detecting method can judge if print data is lost. On the other hand, a trouble which causes turning off of the power source can be solved by a conventional arrangement to connect a back-up power source not only to the back-up storage section 65 but also at least to the interface section 61, the controller section 67 and the trouble detector section 63 when a trouble occurs.

An arrangement to solve a power-off trouble is one which completes S65 through S71 before the power source is turned off, and omits the controlling operations of S84 and onwards which depend on the time consumed in trouble solving.

Figure 14:
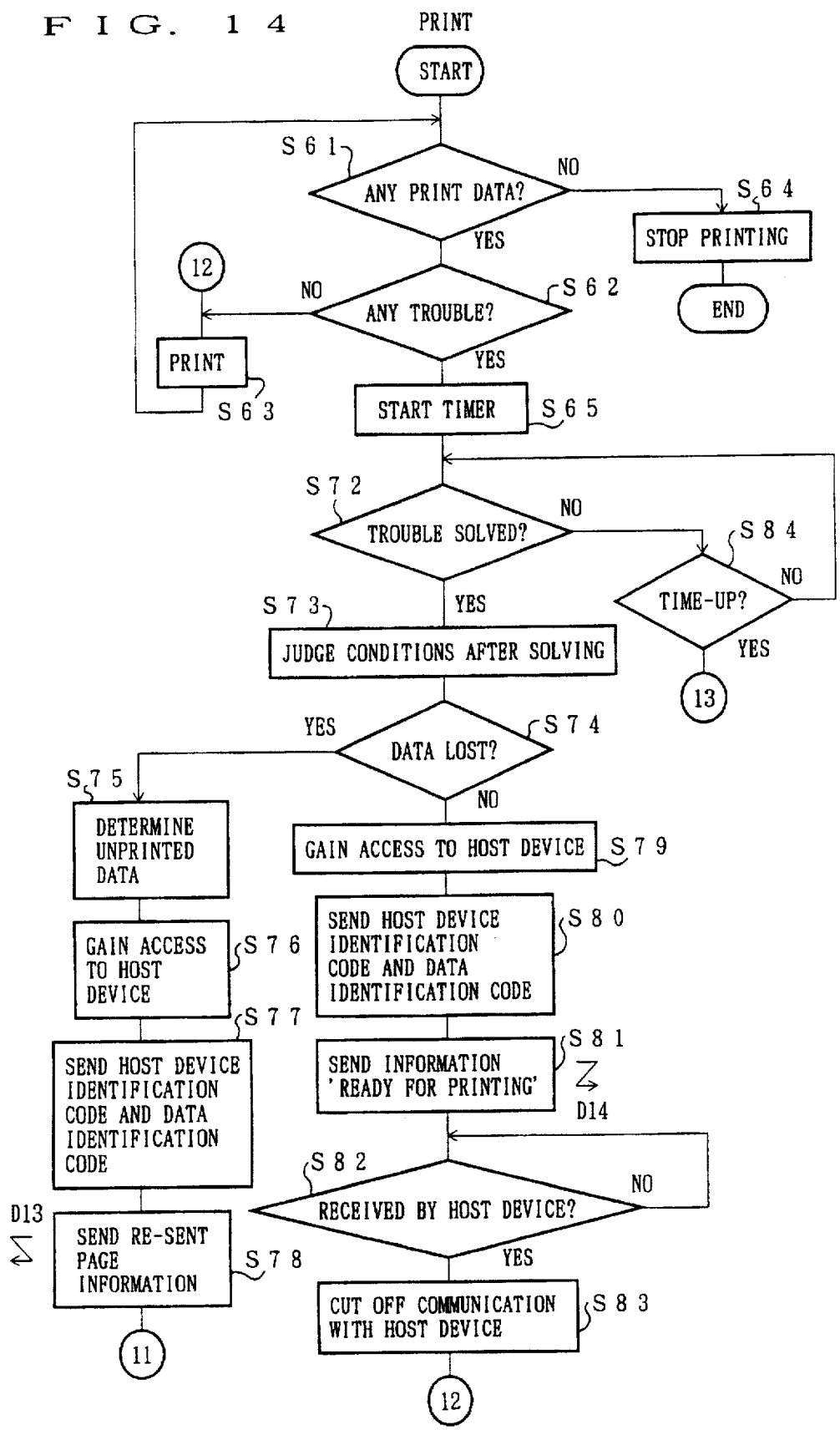
FIG. 14 is a flow chart showing another example of a printing operation of a digital copying machine arranged as in FIG. 6.

Another arrangement to solve a power-off trouble follows the operations of the digital copying machine 10 in FIG. 11 except S66 through S71, which is shown in FIG. 14. In this case, printing conditions of the digital copying machine 10 such as the number of printed pages are stored one after another in the back-up storage section 65 by the printing control operation of the controller section 67. The digital copying machine 10 can thus carry out the operations of S72 and onwards under the control of the controller section 67 after the trouble is solved and the power is turned on.

Referring to FIG. 15 through FIG. 20, the following description discusses a further embodiment of the present invention. Here, for convenience, those means of the following embodiment that have the same function, and that are mentioned in the above-mentioned embodiments are indicated by the same reference numerals and description thereof is omitted.

Figure 15:
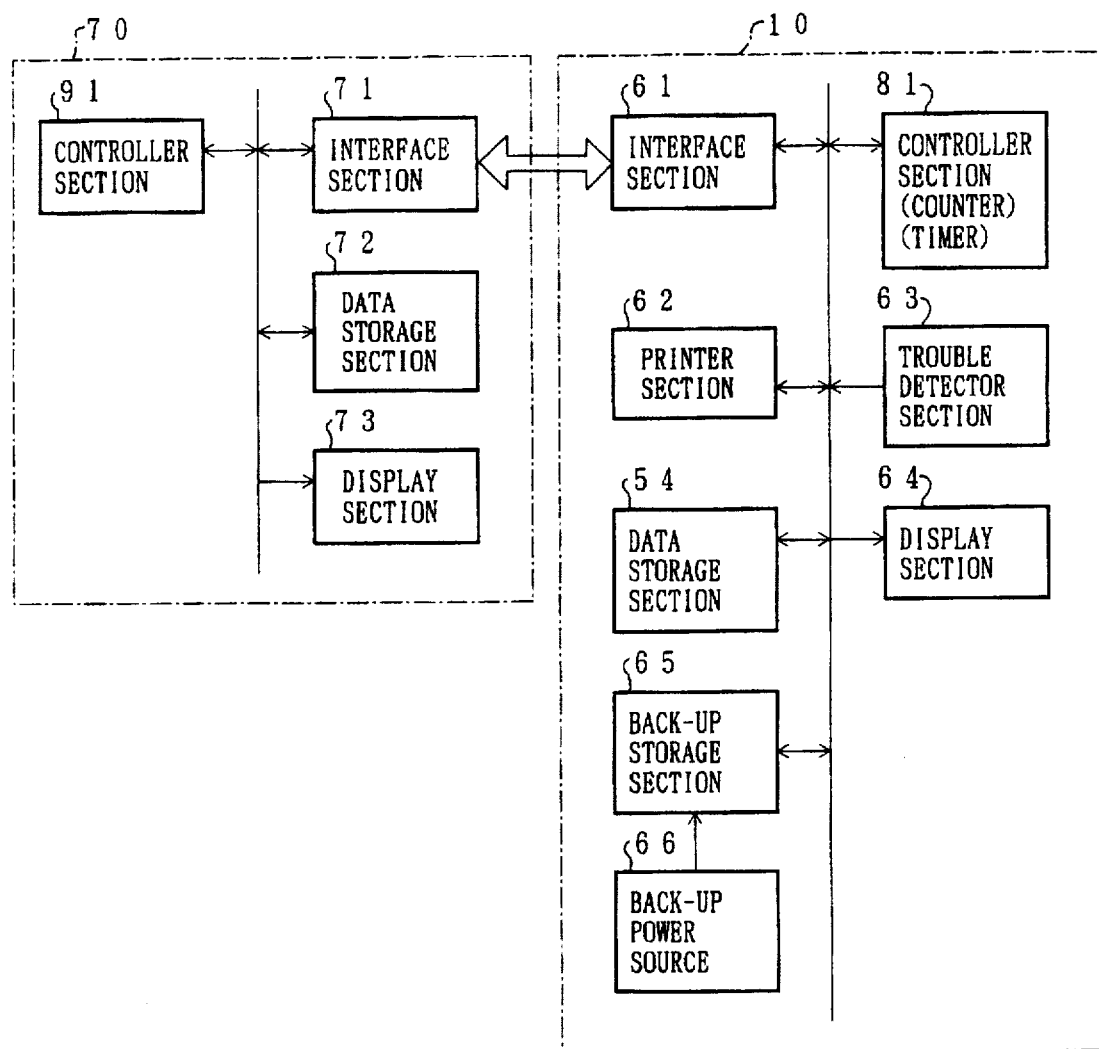
FIG. 15 is a block diagram showing the arrangement of main parts of a data printing and outputting apparatus of a further embodiment in accordance with the present invention.

The data printing and outputting apparatus of the present embodiment as in FIG. 15, like the foregoing second embodiment as in FIG. 6, is provided with a back-up storage section 65, a back-up power source 66, a controller section 81 which works as a communication controlling means on the printer side, a trouble condition analyzing means, and an unoutputted data detecting means and substitutes for the controller section 67 of the digital copying machine 10 in FIG. 6, and a controller section 91 which works as a communication controlling means on the host device side and a data-identifying-information setting means and substitutes for the controller section 75 of the host device 70 in FIG. 6. The controller section 81 of the digital copying machine 10, like the controller section 67, watches if the printer section 62 is printing data, and has a function of a counter to count printed pages. In addition, the controller section 81 controls the operations shown in FIG. 17 through FIG. 19, while the controller section 91 controls the operations shown in FIGS. 16 and 20.

The following description will discuss operations of the present data printing and outputting apparatus having the above arrangement.

When the host device 70 receives a command, e.g. through a keyboard, to print the image data stored in the data storage 72 in FIG. 15, the host device 70 selects a digital copying machine 10 for use in printing in accordance with the operations shown in FIG. 8, and sends print data in accordance with the operations shown in FIG. 9.

Figure 16:
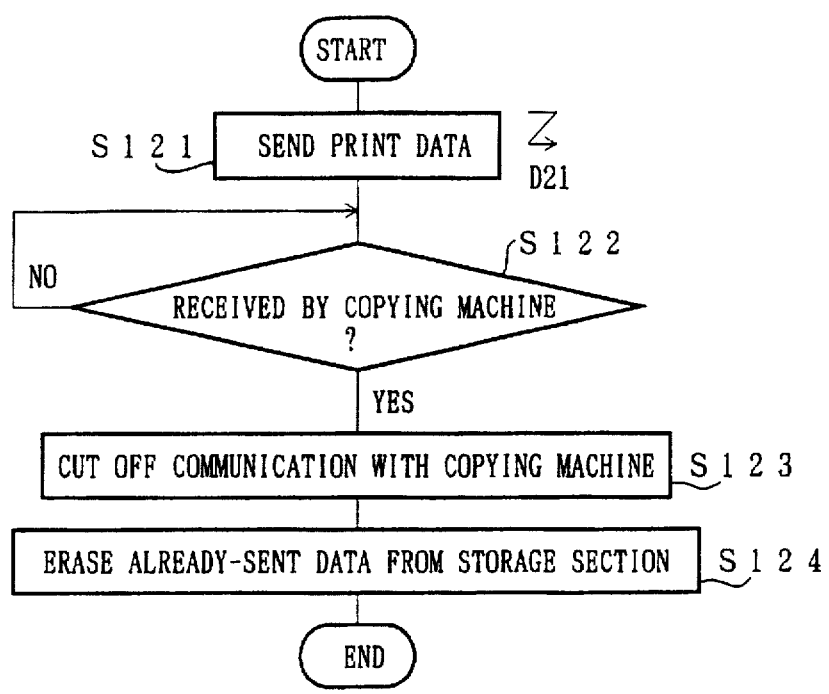
FIG. 16 is a flow chart showing a data sending operation of the host device arranged as in FIG. 15.

This data sending is carried out in accordance with the operations shown in FIG. 16: the controlling section 91 sends print data stored in the data storage section 72 through the interface section 71 to the already-selected digital copying machine 10 (S121, D21). This print data has the structure shown in FIG. 7. The copying machine number in the data identification code may be assigned when the print data is sent by the controlling section 91. The controller section 91 then controls the interface section 71 to cut off the communication with the digital copying machine 10 (S123) after the digital copying machine 10 completes the reception of the print data (S122). The controller section 91 then erases the already-sent data from the data storage section 72 (S124).

Figure 17:
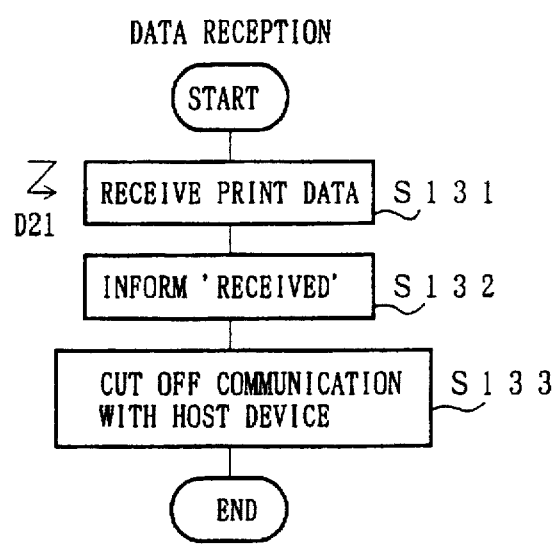
FIG. 17 is a flow chart showing a data receiving operation of the digital copying machine arranged as in FIG. 15.

Responding to host device 70's data sending operation described above, the digital copying machine 10 carries out data receiving operations as shown in FIG. 17: the digital copying machine 10 selected by the host device 70 receives print data sent from the host device 70 through the interface section 61 (S131, D21) and store the print data in the data storage section 54. When the reception is completed, the controller section 81 controls the interface section 61 to inform the host device 70 of the completion (S132). The controller section 81 then controls the interface section 61 to cut off its communication with the host device 70 (S133).

Figure 18:
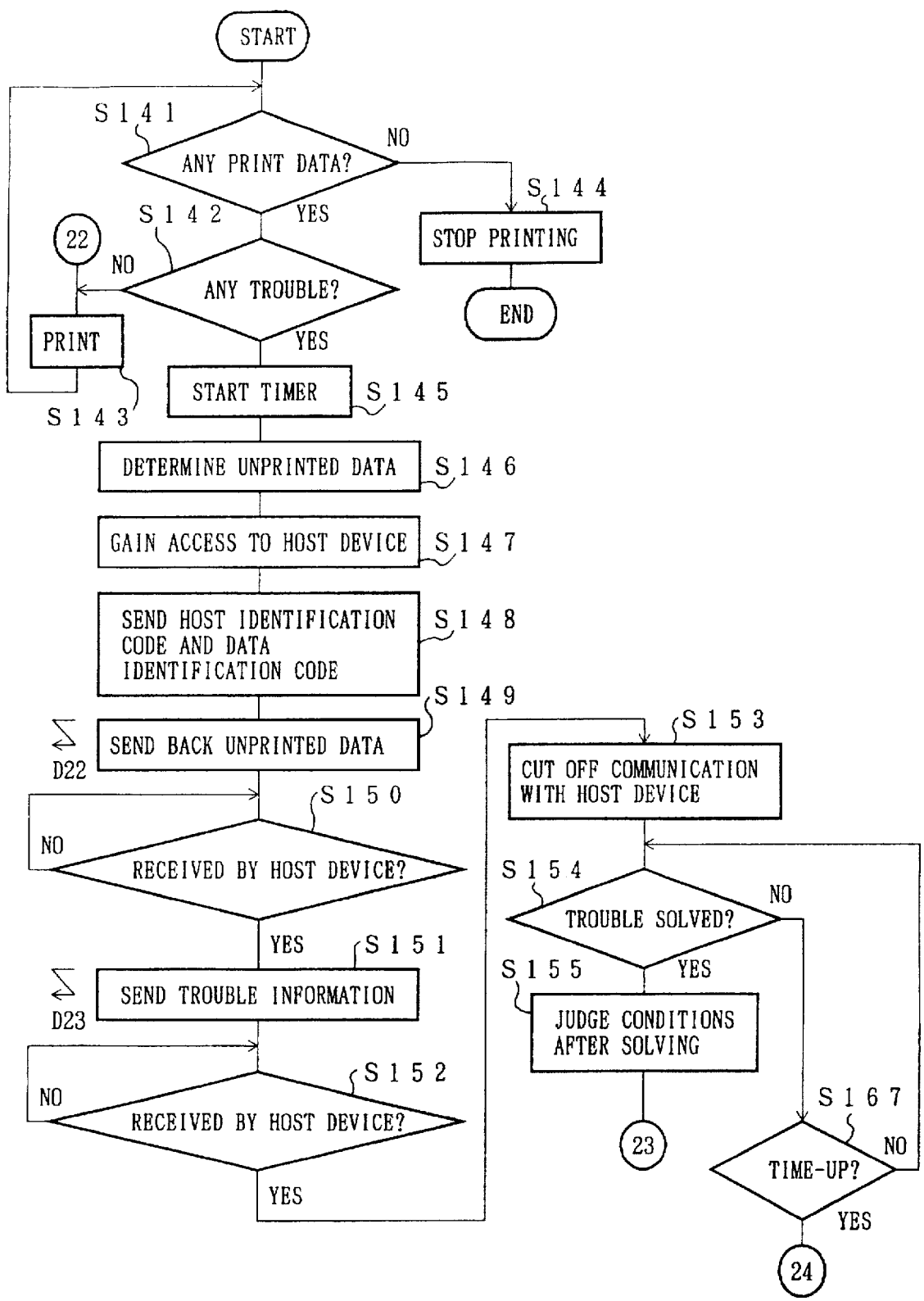
FIG. 18 is a flow chart showing a printing operation of the digital copying machine arranged as in FIG. 15.
Figure 19:
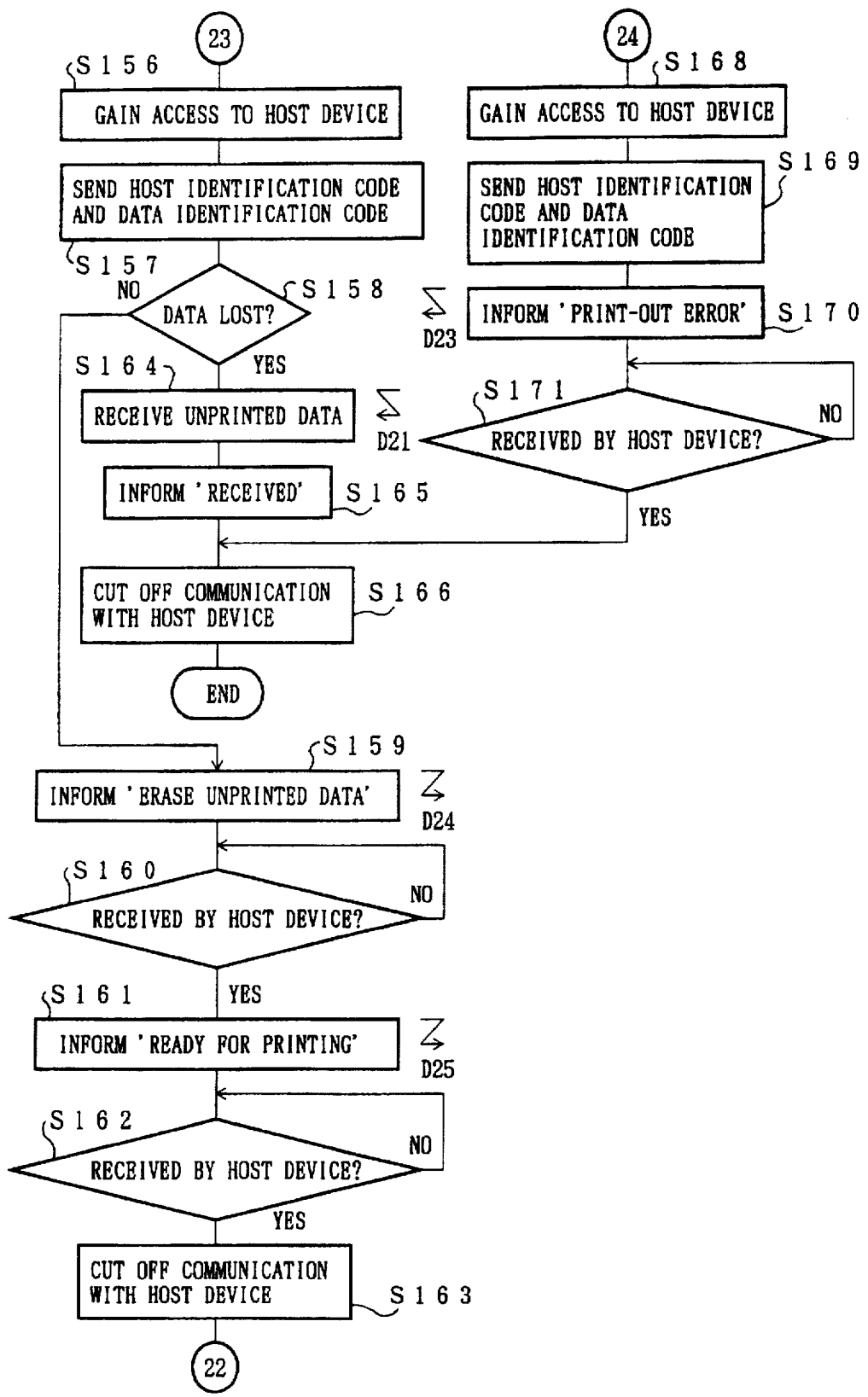
FIG. 19 is a flow chart showing a printing operation of the digital copying machine which follows the operation shown in FIG. 18.

The print data stored in the data storage 54 is printed in paper in accordance with the operations shown in FIGS. 18 and 19: if there is print data in the data storage 54 (S141) and if no trouble is detected with the digital copying machine 10 by the trouble detector section 63 (S142), the controller section 81 controls the printer section 62 to print out the print data (S143). When there is no more data (S141), the controller section 81 stops printing (S144), and finishes the operations.

However, if a trouble is detected in S142, the controller section 81 starts a timer (S145), determines unprinted data based on the function which counts the printed data (S146), and stores the data identification code and the host identification code of the unprinted data in the back-up storage section 65. Next, the digital copying machine 10 gains access to the host device 70 (S147) so as to send the host identification code and the data identification code (S148) and so as to send the unprinted data in the data storage section 54 (S149, D22).

Next, when the digital copying machine 10 is informed that the host device 70 has completed the reception of the above data (S150), the digital copying machine 10 sends trouble information to the host device 70 (S151, D23). When the digital copying machine 10 is informed that the host device 70 has completed the reception of this trouble information (S152), the controller section 81 of the digital copying machine 10 controls the interface section 61 to cut off its communication with the host device 70 (S153).

Then, when the trouble is solved (S154), the controller section 81 checks the after-trouble conditions, or in other words, checks to see if there is any loss in print data in the data storage section 54 (S155). Next, the digital copying machine 10, as shown in FIG. 19, gains access to the host device 70 (S156) and sends the host identification code and the data identification code (S157) which were stored in the back-up storage section 65 when the trouble occurred. If any loss in the print data in the data storage section 54 is found in the above S155 (S158), the digital copying machine 10 receives unprinted data sent from the host device 70 (S164, D21), informs the host device 70 that the reception of the data is completed (S165), and then cuts off the communication with the host device 70 (S166). This unprinted data is the data sent back from the digital copying machine 10 to the host device 70 before the trouble occurred. In addition, operations S164 through S166 are data receiving operations of the digital copying machine 10 in FIG. 17.

However, if no loss in the print data is found in S158, the digital copying machine 10 sends to the host device 70 information to erase the unprinted data (S159, D24). Then, when the digital copying machine is informed that the host device 70 has completed the reception of the information (S160), the digital copying machine 10 informs the host device 70 that the digital copying machine 10 is ready for printing (S161, D25). Then, if the digital copying machine is informed that the host device 70 has completed the reception of the information (S162), the digital copying machine 10 cuts off the communication with the host device 70 (S163), and shifts to S143 in FIG. 18 to print out data.

In addition, if the predetermined time measured by the timer of the controller section 81 is up before the trouble is solved in S154 in FIG. 18 (S167), the digital copying machine 10 gains access to the host device 70 (S168), and sends (1) the host identification code and the data identification code (S169) and (2) the print-out error information (S170, D23) as shown in FIG. 19. Then, upon receiving a response from the host device 70 that the reception is completed (S171), S166 is proceeded to so that the controller section 81 controls the interface section 61 to cut off its communication with the host device 70.

Figure 20:
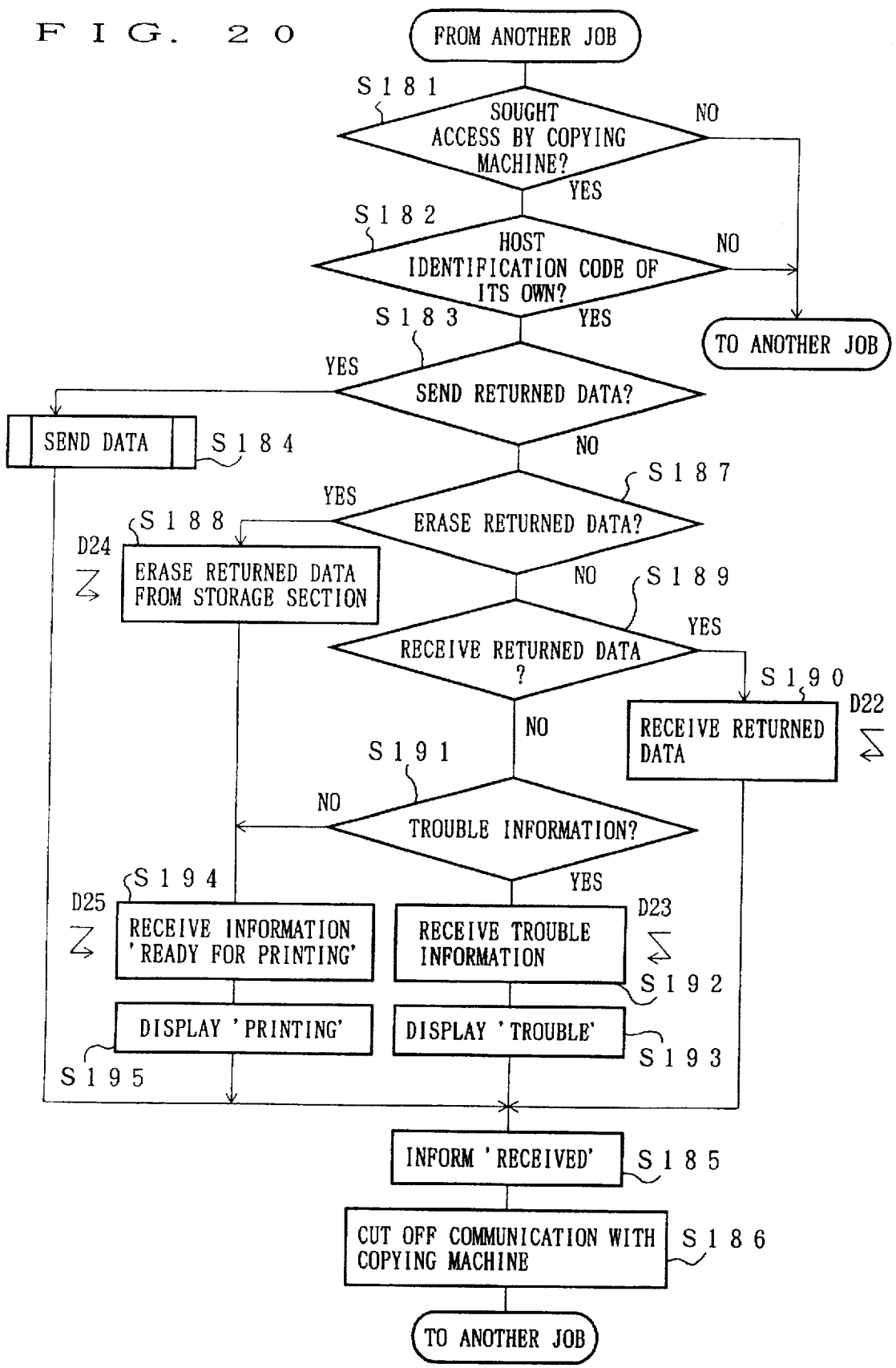
FIG. 20 is a flow chart showing host device's operations in response to digital copying machine's operations in FIGS. 18 and 19.

The host device 70, in response to the operations of the digital copying machine 10 shown in FIGS. 18 and 19, carries out operations in FIG. 20. In this case, if access is sought from the digital copying machine 10 (S181), the host device 70, shifting from its current job, judges if the host identification code sent from the digital copying machine 10 is its own code (S182). If the host device 70 receives its own host identification code and a request from the digital copying machine for sending the returned print data (S183), the host device 70 carries out the operations shown in FIG. 16 to send the digital copying machine 10 print data which has been previously sent back from the digital copying machine 10. In this case, the judgement on print data to be sent to the digital copying machine can be made in accordance with the data identification code sent from the digital copying machine 10.

Then, upon receiving a response from the digital copying machine 10 that the reception of the print data is completed (S185), the host device 70 cuts off the communication with the digital copying machine 10 (S186) and shifts to another job.

Moreover, if the request from the digital copying machine 10 asks for erasing of the returned data (S187), the controller section 91 of the host device 70 erases the data which was returned from the digital copying machine 10 and stored in the data storage section 72 (S188). Then S185 is proceeded to so as to control the display section 73 to display that the printing is on at the digital copying machine 10, and following operations are carried out.

Furthermore, if the received request from the digital copying machine 10 asks for reception of returned data (S189), the host device 70 receives the data returned from the digital copying machine 10 (S190), and stores the data in the data storage section 72.

In addition, if a trouble information is sent from the digital copying machine (S191), the host device 70 receives (S192) and displays the information (S193). On the other hand, if a non-trouble information is sent in S191, which means the printer is ready for printing, the host device receives the information (S194, D25), displays 'printing on' (S195), and shifts to S185.

The host device 70 in S193 above displays the printing suspension caused either by digital copying machine 10's trouble whose information is received by the host device 70 through digital copying machine 10's operation S151, or by print-out error whose information is received by the host device 70 through digital copying machine 10's operation S170. This display, like that of the data printing and outputting apparatus of the second embodiment, enables the host device 70 to transfer the data printing task to another digital copying machine 10 to continue printing, thus increasing host device 70's job efficiency and making quick printing possible when the user is in a hurry.

In addition, the present data printing and outputting apparatus, sharing the same features as the second embodiment, may be arranged so that the host device 70 shifts to the copying machine-selecting operation shown in FIG. 8 automatically and instantly when the host device 70 receives a trouble information such as the above print-out error.

Furthermore, the data printing and outputting apparatus of the present embodiment is arranged to cut off the communication between the host device 70 and the digital copying machine 10 after both the sending and the reception of print data and other information between the host device 70 and digital copying machine 10 are completed. This arrangement can cut down the communication time between the host device 70 and the digital copying machine 10, and can increase host device 70's job efficiency further than the arrangement shown in the first embodiment.

Besides, according to the present data printing and outputting apparatus, print data to be printed by the digital copying machine 10 is sent from the host device 70 to the digital copying machine 10, and is then erased from the data storage section 72 of the host device 70. If there is a trouble with the digital copying machine 10, the print data stored in the data storage section 54 of the digital copying machine 10 is retreated to the host device 70. And, if there is loss in the print data stored in the data storage section 54 of the digital copying machine 10, the print data retreated to the host device 70 is sent back to the digital copying machine 10 after the trouble is solved. If there is no loss, the retreated data is erased. Thus, the data storage section 72 of the host device 70 can be used efficiently, and the host device 70 can increase its job efficiency. Also, after the trouble is solved, the printing operation of the digital copying machine 10 can be restarted smoothly.

The print data to retreat from the digital copying machine 10 to the host device 70 is limited only to the unprinted data, thereby reducing the host device 70's workload in sending and receiving of the print data between the host device 70 and the digital copying machine 10. This can further increase host device 70's job efficiency.

Figure 21:
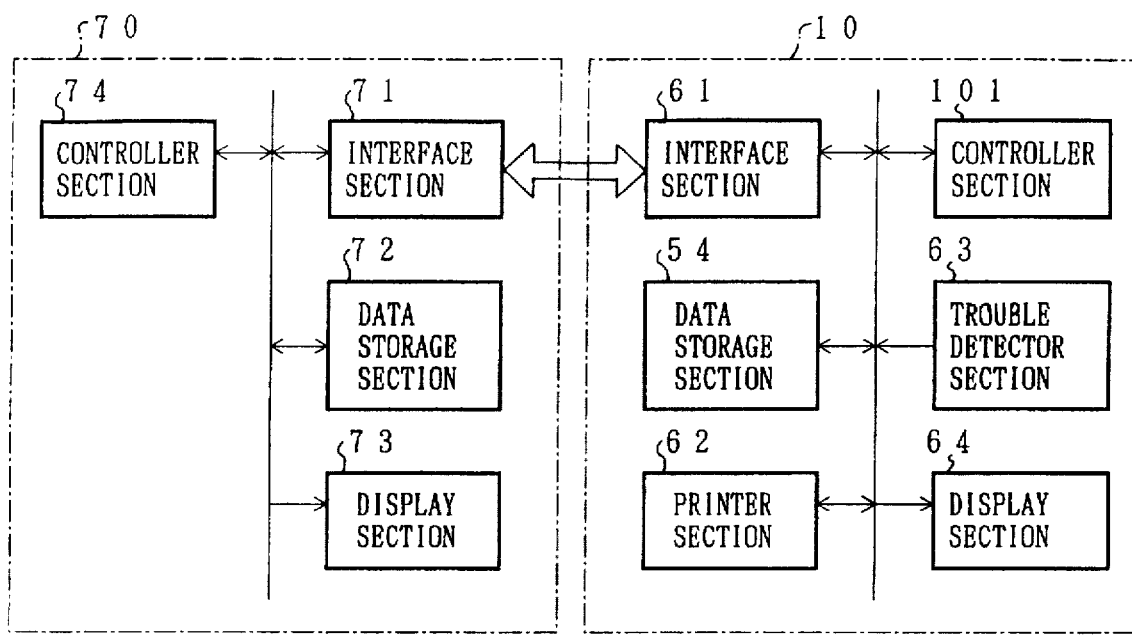
FIG. 21 is a block diagram showing the arrangement of main parts of a data printing and outputting apparatus of still a further embodiment in accordance with the present invention.
Figure 22:
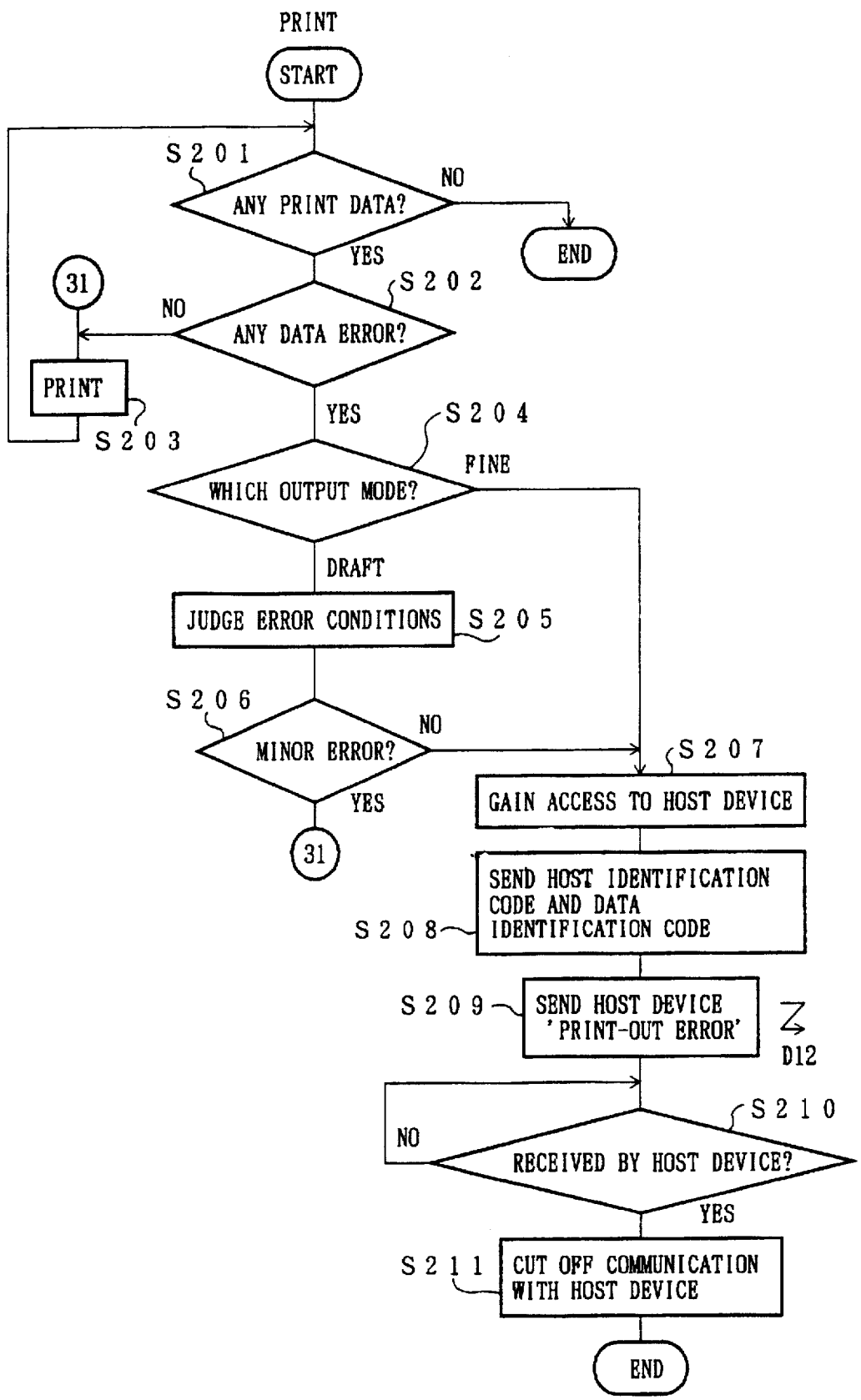
FIG. 22 is a flow chart showing a data sending operation of the host device arranged as in FIG. 21.

Referring to FIGS. 21 and 22, the following description discusses still a further embodiment of the present invention. Here, for convenience, those means of the following embodiment that have the same function, and that are mentioned in the above-mentioned embodiments are indicated by the same reference numerals and description thereof is omitted.

The data printing and outputting apparatus of the present embodiment is provided with a controller section 101 which works as data error detecting means, error amount detecting means, and printing controlling means, the controller section 101 substituting for the controller section 55 as shown in FIG. 21. The print data to be sent from the host device 70 to the digital copying machine 10 in the present embodiment is not a code to show print data, but data which has been developed in the host device 70 to be used as data for printing. In addition, the digital copying machine 10 can select either the draft mode or the fine mode, in other words, a rough mode and a non-rough mode respectively, for the output mode.

The draft mode is provided to give priority to quick printing by sacrificing print quality. Consequently, the print quality is relatively low. On the other hand, the fine mode is provided to give more print quality than the draft mode, but more time-consuming.

The controller section 101 detects an error in the print data, and if there is an error, judges the error amount to see if the detected error is a minor error whose amount is within the tolerance of the print quality of the draft mode or a major one whose amount exceeds the tolerance. The criterion to judge if the error is minor is: for example, one or two dots are acceptable while three or more is not, and an error spanning three or less dots in both the main scanning direction and the second scanning direction is acceptable while an error spanning four or more is not for each 48-bite data (corresponding to 3 mm width in printing) in 400 dpi print data. The operations shown in FIG. 22 are controlled by the controller section 101. The controller section 101 judges the error according to the parity of the print data (e.g.

the data shown in FIG. 7) when the controller section 101 reads out the print data to be printed from the printer section 62. After this judgement, the controller section 101 carries out the operation shown in FIG. 22.

With the arrangement, the following description will discuss operations of the present data printing and outputting apparatus.

The host device 70 sends print data to the digital copying machine 10 in accordance with the data sending operation in FIG. 9. The digital copying machine 10 then receives the print data in accordance with the data receiving operation in FIG. 10. This data is printed by the digital copying machine 10 through the operation shown in FIG. 22.

Here, if any print data is stored in the data storage section 54 (S201), the controller section 101 reads out the print data and judges if there is a data error (S202) in the print data. If no error is found in the judgement, the printer section 62 prints the print data until the print data runs out (S203, S201).

In addition, if there is a data error in S202, and the draft mode is selected for the output mode (S204), the controller section 101 judges the error (S205). If it is a minor error whose amount is small (S206), S203 is proceeded to so that the controlling section 101 continues printing.

On the other hand, if the fine mode is selected for the output mode in S204, the digital copying machine 10 gains access to the host device 70 (S207), sends the host identification code and the data identification code (S208) and sends print-out error information (S209, D12). Then, upon receiving a response that the host device 70 has completed the reception (S210), the digital copying machine 10 cuts off the communication with the host device 70 (S211). If the controller section 101 judges the trouble to be a major one in S206, S207 is proceeded to.

In response to the processes S207 through S209 above, the host device 70 carries out processes, for example, S101 through S103 and S107 through S111 in FIG. 13. Thus, the display section 73 (S109) displays the trouble, i.e., the print-out error.

As described above, if there is a data error and the fine mode is selected for the output mode, the present data printing and outputting apparatus stops printing. But if the draft mode is selected, it continues or stops printing, depending on the error degree. Therefore, compared with an arrangement which stops printing whenever there is a data error, or with an arrangement which prints data without checking if there is a data error, the present arrangement enables the host device 70 to avoid resending print data to the digital copying machine 10 and starting printing all over again in order to obtain an image with a desired print quality. This causes a reduction in the host device 70's workload while maintaining the desired high print quality. Furthermore, when the fine mode is selected for the output mode, it prevents an image with a low print quality from being printed out.

In addition, since the digital copying machine 10 does not print data even in the draft mode when the error amount of the print data exceeds the predetermined amount, the printing out of an image with a low print quality which does not fall within the tolerance is avoided.

In the above embodiment if there occurs a data error in the fine mode or a major error in the draft mode, the data printing and outputting apparatus stops its operations as a print-out error (S207 through S211) But, it may be designed so that the host device 70 resends print data through operations S75 through S78 in FIG. 11, or S51 through S53 in FIG. 10.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. A data printing and outputting apparatus, comprising:

a host device; and a printer, connected with the host device through a communication line, for printing output data, wherein said printer includes, received data storing means for storing print data sent from the host device;

trouble detecting means, provided in said printer, for detecting trouble with the printer, and for outputting a trouble condition signal indicative of conditions of the detected trouble;

trouble analyzing means for monitoring a printing operation of the printer, and for judging based on the trouble condition signal if the trouble with the printer is relatively minor and does not take a relatively large amount of time to solve or relatively major and may take a relatively large amount of time to solve; and communication controlling means for maintaining communication between the host device and the printer when the trouble is judged to be relatively minor by the trouble analyzing means based on the trouble condition signal sent from the trouble detecting means, and for stopping the communication when the trouble is judged to be relatively major.

2. The data printing and outputting apparatus as defined in claim 1, wherein the printer further includes time measuring means for measuring a predetermined time elapsed after the trouble has occurred, and wherein the communication controlling means stops the communication between the host device and the printer when the predetermined elapsed time measured by the time measuring means expires prior to the trouble being solved.

3. The data printing and outputting apparatus as defined in claim 1, wherein the printer further includes display means for displaying the trouble detected by the trouble detecting means.

4. The data printing and outputting apparatus as defined in claim 1, wherein the printer further includes display means for displaying the communication stoppage between the host device and the printer when the communication is stopped.

5. The data printing and outputting apparatus as defined in claim 1, wherein the host device further includes display means for displaying the trouble occurring with the printer based on trouble information sent through the communication line.

6. The data printing and outputting apparatus as defined in claim 1, wherein the host device further includes display means for displaying the communication stoppage between the host device and the printer when the communication is stopped.

7. A data printing and outputting apparatus, comprising:

a host device;

a printer, connected with the host device through a communication line, for printing and outputting data;

transmission data storing means, provided in the host device, for storing print data to be sent to the printer, and for deleting the print data after the print data is sent to the printer;

host device-side communication controlling means, provided in the host device, for controlling the sending of the print data from the transmission data storing means to the printer;

received data storing means, provided in the printer, for storing received print data sent from the host device, and for maintaining storage of the print data, subsequent to resending of the print data to the host device;

trouble detecting means, provided in the printer, for detecting trouble with the printer; and printer-side communication controlling means, provided in the printer, for resending, back to the host device, the print data stored in the received data storing means when trouble is detected with the printer by the trouble detecting means, wherein at least one of the host device-side and printer-side communication controlling means stops the communication between the host device and the printer subsequent to completion of the data sending and receiving between the host device and the printer.

8. The data printing and outputting apparatus as defined in claim 7, further comprising:

data-identifying-information setting means for establishing, with respect to the print data sent from the host device and currently being printed by the printer, data identifying information for identifying the print data; and trouble analyzing means for judging, when trouble is detected by the trouble detecting means, if the detected trouble is print data loss trouble related to a loss in the received print data, wherein the received data storing means stores the print data sent from the host device in correspondence with the data identifying information, the printer-side communication controlling means, when trouble is judged to be print data loss trouble by the trouble analyzing means, gains access to the host device after the trouble is resolved to send the data identifying information of the print data which was previously returned to the host device, and to request the host device to resend the print data, and the host device-side communication controlling means resends the print data corresponding to the data identifying information which is requested to be resent.

9. The data printing and outputting apparatus as defined in claim 8, wherein the received data storing means further includes, a data storage section for storing print data; and a back-up storage section for storing the data identifying information and for maintaining storage even when a power source is off.

10. The data printing and outputting apparatus as defined in claim 7, further comprising:

data-identifying-information setting means for establishing data identifying information for a predetermined amount of the print data, the data identifying information indicating the print data which is being sent from the host device and currently being received by the printer; and unoutputted data detecting means, provided in the printer, for detecting unoutputted data, not yet printed out by the printer, trouble analyzing means for judging, when trouble is detected by the trouble detecting means, if the detected trouble is print data loss trouble related to a loss in the received print data, wherein the received data storing means stores the print data sent from the host device in correspondence with the data identifying information, the printer-side communication controlling means, when the trouble with the printer is detected by the trouble detecting means, sends back to the host device the unoutputted data detected by the unoutputted detecting means together with the data identifying information of the unoutputted data, the printer-side communication controlling means, when the detected trouble is judged to be the print data loss trouble by the trouble analyzing means, gains access to the host device after the trouble is resolved so as to send the data identifying information of the unoutputted data which was previously returned to the host device, and so as to request the host device to resend the print data corresponding to the data identifying information, and the host device-side communication controlling means resends the print data corresponding to the data identifying information which is requested to be resent.

11. The data printing and outputting apparatus as defined in claim 7, wherein the printer further includes time measuring means for measuring a predetermined elapsed time after the trouble has occurred, and the printer-side communication controlling means stops the communication between the host device and the printer when the predetermined elapsed time measured by the time measuring means expires prior to the trouble being resolved.

12. The data printing and outputting apparatus as defined in claim 7, wherein the host device further includes display means for displaying trouble occurring with the printer based on the trouble information sent through the communication line.

13. A data printing and outputting apparatus, comprising:

a host device;

a printer, connected with the host device through a communication line, for printing print data sent from the host device in accordance with a selected mode, the mode being selected from a rough mode with low print quality and a non-rough mode with relatively higher print quality;

data error detecting means, provided in the printer, for detecting an error occurring in the print data at the printer; and print controlling means, provided in the printer, for maintaining the printing operation at the printer when the error of the print data is detected by the data error detecting means and the rough mode is the selected mode.

14. The data printing and outputting apparatus as defined in claim 13, wherein the print controlling means stops the printing operation at the printer when the error of the print data is detected by the data error detecting means and the non-rough mode is the selected mode.

15. A data printing and outputting apparatus, comprising:

a host device; and a printer, connected with the host device through a communication line, for printing the print data sent from the host device in accordance with a selected mode, the mode being selected from a rough mode with low print quality and a non-rough mode with relatively higher print quality, wherein said printer further includes, data error detecting means for detecting an error occurring in the print data at the printer, error amount detecting means for detecting an amount of the error, and print controlling means for maintaining the printing operation at the printer when the rough mode is the selected mode and the error amount detected by the error amount detecting means does not exceed a predetermined amount, and for stopping the printing operation at the printer when the rough mode is the selected mode and the error amount exceeds the predetermined amount.

16. The data printing and outputting apparatus as defined in claim 15, wherein the host device further includes display means for displaying the detected error occurring with the printer based on information sent through the communication line.

17. A data printing method for a printer connected to a host device through a communication line, comprising the steps of:

selecting one of a rough mode with low print quality and a non-rough mode with relatively higher print quality;

printing, at the printer, print data sent from the host device in accordance with the selected mode;

detecting whether or not an error has occurred in the print data at the printer; and maintaining the printing operation at the printer when an error is detected and when the rough mode is the selected mode.

18. The data printing method of claim 17, further comprising the step of:

stopping the printing operation at the printer when an error is detected and when the non-rough mode is the selected mode.

19. The data printing method of claim 18, further comprising the step of:

detecting an amount of an error when an error is detected, wherein the printing operation is maintained at the printer when the rough mode is the selected mode and the detected error amount does not exceed a predetermined amount, and wherein the printing operation is stopped at the printer when the rough mode is the selected mode and the detected error amount exceeds the predetermined amount.

20. The data printing method of claim 19, further comprising the step of:

displaying a detected error occurring with the printer based on information sent through the communication line.

* * * * *